(12) United States Patent
Griggs et al.

(10) Patent No.: US 10,704,724 B1
(45) Date of Patent: *Jul. 7, 2020

(54) FITTINGS FOR JOINING LENGTHS OF PIPE BY A PRESS-FIT CONNECTION AND PIPE ASSEMBLY FORMED USING SAME

(71) Applicant: Robert L. Griggs, Jr., O'Fallon, MO (US)

(72) Inventors: Robert L. Griggs, Saint Charles, MO (US); Anthony Lee Baker, Wentzville, MO (US); Andrew Joseph Griggs, St. Peters, MO (US); Daniel Jude Lamartina, St. Peters, MO (US); John W. Van Camp, St. Peters, MO (US)

(73) Assignee: Robert L. Griggs, Jr., O'Fallon, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,087

(22) Filed: Oct. 7, 2019

Related U.S. Application Data

(63) Continuation of application No. 16/434,687, filed on Jun. 7, 2019.

(Continued)

(51) Int. Cl.
*F16L 37/133* (2006.01)

(52) U.S. Cl.
CPC .................................. *F16L 37/133* (2013.01)

(58) Field of Classification Search
CPC ......... F16L 37/133; F16L 37/00; F16L 37/02; F16L 37/08; F16L 37/084; F16L 25/10; F16L 47/06

(Continued)

(56) References Cited

U.S. PATENT DOCUMENTS

| 3,817,561 A | 6/1974 | Kay | |
|---|---|---|---|
| 4,298,221 A * | 11/1981 | McGugan | B23P 11/02 285/328 |

(Continued)

FOREIGN PATENT DOCUMENTS

| CA | 3009415 A1 | 6/2017 |
|---|---|---|
| CA | 3009423 A1 | 6/2017 |

(Continued)

OTHER PUBLICATIONS

English translation of CN2113398U Abstract.

(Continued)

*Primary Examiner* — Aaron M Dunwoody
(74) *Attorney, Agent, or Firm* — Benesch, Friedlander, Coplan & Aronoff LLP; Thomas Y. Kendrick

(57) ABSTRACT

A pipe assembly is provided, including a male fitting having an alignment tooth and at least one load tooth. The alignment tooth includes a first axial surface, a first ramped surface, a second axial surface, and a first radial surface. The load tooth includes a third axial, a second ramped surface, a fourth axial surface, and a second radial surface. The assembly includes a female fitting having an alignment cavity and at least one load cavity. The alignment cavity includes a first axial surface, a first ramped surface, a second axial surface, and a first radial surface. The load cavity includes a third axial surface, a second ramped surface, a fourth axial surface, and a second radial surface. When the male fitting is fully engaged with the female fitting, the alignment tooth fits within the alignment cavity, and the load tooth fits within the load cavity.

20 Claims, 26 Drawing Sheets

Related U.S. Application Data

(60) Provisional application No. 62/836,566, filed on Apr. 19, 2019.

(58) Field of Classification Search
USPC .............................. 285/330, 328, 332.4, 921
See application file for complete search history.

(56) References Cited

U.S. PATENT DOCUMENTS

| | | | |
|---|---|---|---|
| 4,600,037 A | | 7/1986 | Hatten |
| 4,779,902 A | | 10/1988 | Lee |
| 4,958,959 A | * | 9/1990 | St. Onge ................ F16L 1/036 138/97 |
| 5,015,014 A | * | 5/1991 | Sweeney ................ F16L 47/12 285/328 |
| 5,360,242 A | * | 11/1994 | Argent ................ E21B 17/0426 228/189 |
| 5,547,230 A | | 8/1996 | Bank et al. |
| 5,921,591 A | * | 7/1999 | Argent ................ E21B 17/0426 228/135 |
| 6,308,992 B1 | | 10/2001 | Mitsui et al. |
| 6,860,420 B2 | * | 3/2005 | Filippov ................ B23K 20/16 228/246 |
| 7,918,006 B2 | | 4/2011 | Semyon |
| 2006/0170213 A1 | * | 8/2006 | Mittler ................ E21B 17/04 285/328 |
| 2014/0138944 A1 | | 5/2014 | Kury |
| 2018/0372248 A1 | | 12/2018 | Hundeshagen et al. |
| 2018/0372249 A1 | | 12/2018 | Hundeshagen et al. |

FOREIGN PATENT DOCUMENTS

| | | |
|---|---|---|
| CA | 3009479 A1 | 6/2017 |
| CN | 2113398 U | 8/1992 |
| CN | 2299213 Y | 12/1998 |
| CN | 2787978 Y | 6/2006 |
| CN | 104806835 A | 7/2015 |
| JP | 5918293 B2 | 5/2016 |
| WO | 2012136784 A2 | 10/2012 |
| WO | 2015083807 A1 | 6/2015 |

OTHER PUBLICATIONS

English translation of CN22992113Y Abstract.
English translation of CN2787978Y Abstract.
English translation of CN104806835A Abstract.
English translation of JP5918293 Abstract.

* cited by examiner

TRI-LOC MT Joint Assembly Forces

| | TRI-LOC MT test 1 (Lubricated) | | | | |
|---|---|---|---|---|---|
| Pressure (psi) | - | - | 750 | 1,500 | 2,800 |
| Axial Force (lbf) | - | - | 11,928 | 23,856 | 44,532 |
| Displacement (inch) | 0.00 | 1.09 | 2.25 | 3.31 | 4.62 |
| | TRI-LOC MT test 2 (Not lubricated) | | | | |
| Pressure (psi) | - | - | 500 | 1,200 | 2,000 |
| Axial Force (lbf) | - | - | 7,952 | 19,085 | 31,809 |
| Displacement (inch) | 0.00 | 1.09 | 2.25 | 3.31 | 4.62 |
| Tooth | 0 | 1 | 2 | 3 | 4 |

FIG. 8

FITTINGS FOR JOINING LENGTHS OF PIPE BY A PRESS-FIT CONNECTION AND PIPE ASSEMBLY FORMED USING SAME

CROSS-REFERENCE TO RELATED APPLICATIONS

This application is a continuation of U.S. patent application Ser. No. 16/434,687, filed on Jun. 7, 2019, which claims priority from U.S. Provisional Patent Application No. 62/836,566, filed on Apr. 19, 2019, which are both incorporated by reference herein in their entirety.

BACKGROUND

Creating a pipeline, whether horizontally or vertically, and whether underground or above ground, one typically assembles consecutive lengths of pipe one after the other. Often, pipelines are formed by driving a first section of pipe axially into position, fixing a second length of pipe to the first, driving the joined first and second sections of pipe axially into position, adding a third length, and so on. Two examples of such pipeline formation may include auger boring and micro tunneling.

Traditionally, individual lengths of pipe used in forming a pipeline are arranged in a line, end-to-end, with each being welded to the next as individual lengths of pipe are added to the pipeline. However, welding the individual lengths of pipe to one another is a time-consuming process involving additional danger, high heat, skilled welding personnel, time to allow welds to cool, and possible imperfections in the finished product.

Press-fitting pipes together, where a first pipe with a male end is joined to a second pipe with a female end, is a possible alternative to welding. However, press-fitting lengths of pipe together creates additional challenges, including the great forces/pressures that are required to cause pipes, which may be made of steel or other metals, to deform enough to engage one another in a press-fit fashion. Additionally, press-fitting lengths of pipe to one another using currently-available press-fittings requires precise alignment of the pipes. Where two pipes are not perfectly aligned when pressure is applied to press-fit them together, the pipes may "buck" (that is, bend relative to one another at the union point) which may damage the pipes and/or equipment used to handle and join the pipes.

Furthermore, depending upon the application of the pipeline, the press-fit unions of lengths of pipes have to undergo great forces without separating or failing. Particularly, where pipelines are oriented horizontally, the lengths of pipes and thus the unions between the pipes, experience great compressive stresses during installation. Where pipelines are oriented vertically, the lengths of pipes and thus the unions between the pipes experience both compressive stresses as well as bending stresses. Thus, it is important that once lengths of pipe are press-fit together, they are not capable of being separated without destruction of one or both.

Accordingly, what is needed is a press-fit pipe connection that requires less force/pressure to join corresponding lengths of pipe, while being able to withstand the compressive and bending stresses that the pipes will experience both during installation and operation in the field.

SUMMARY

In one embodiment, a pipe assembly is provided, the assembly comprising: a male fitting, comprising: a body having a radially outer surface and a radially inner surface; a distal end and a proximal end; and an alignment tooth oriented closest to the distal end on a removed portion of the radially outer surface, and at least one load tooth on the removed portion of the radially outer surface, wherein the alignment tooth includes, from an alignment tooth distal direction toward an alignment tooth proximal direction, a first axial surface parallel to an axial direction of the pipe assembly, a first ramped surface biased with respect to the axial direction, a second axial surface parallel to the axial direction, and a first radial surface parallel to a radial direction of the pipe assembly, wherein the at least one load tooth includes, from a load tooth distal direction toward a load tooth proximal direction, a third axial surface parallel to the axial direction, a second ramped surface biased with respect to the axial direction, a fourth axial surface parallel to the axial direction, and a second radial surface parallel to the radial direction, wherein the first axial surface, the second axial surface, the third axial surface, and the fourth axial surface each have a radial height measured from the radially inner surface, and wherein the radial height of the fourth axial surface is greater than the radial height of the second axial surface, the radial height of the second axial surface is greater than the radial height of the first axial surface, and the radial height of the first axial surface is greater than the radial height of the third axial surface, and wherein the first ramped surface is biased at an angle AM1 relative to the axial direction, the second ramped surface is biased at an angle AM2 relative to the axial direction, and wherein the angle AM1 is smaller than the angle AM2, and a female fitting, comprising: a body having a radially inner surface and a radially outer surface; a distal end and a proximal end; and an alignment cavity oriented closest to the proximal end on a removed portion of the radially inner surface, and at least one load cavity on the removed portion of the radially inner surface, wherein the alignment cavity includes, from an alignment cavity proximal direction toward an alignment cavity distal direction, a first axial surface parallel to the axial direction, a first ramped surface biased with respect to the axial direction, a second axial surface parallel to the axial direction, and a first radial surface parallel to the radial direction, wherein the at least one load cavity includes, from a load cavity proximal direction toward a load cavity distal direction, a third axial surface parallel to the axial direction, a second ramped surface biased with respect to the axial direction, a fourth axial surface parallel to the axial direction, and a second radial surface parallel to the radial direction, wherein the first axial surface, the second axial surface, the third axial surface, and the fourth axial surface each have a radial height measured from the radially outer surface, and wherein the radial height of the third axial surface is greater than the radial height of the first axial surface, the radial height of the first axial surface is greater than the radial height of the second axial surface, and the radial height of the second axial surface is greater than the radial height of the fourth axial surface, and wherein the first ramped surface is biased at an angle AF1 relative to the axial direction, the second ramped surface is biased at an angle AF2 relative to the axial direction, and wherein the angle AF1 is smaller than the angle AF2, and when the male fitting is fully engaged with the female fitting, the alignment tooth fits within the alignment cavity, and the load tooth fits within the load cavity.

In another embodiment, a pipe assembly is provided, the assembly comprising: a male fitting, comprising: a body having a radially outer surface and a radially inner surface; a distal end and a proximal end; and an alignment tooth oriented closest to the distal end on a removed portion of the radially outer surface, and at least one load tooth on the removed portion of the radially outer surface, wherein the alignment tooth includes, from an alignment tooth distal direction toward an alignment tooth proximal direction, a first axial surface parallel to an axial direction of the pipe assembly, a first ramped surface biased with respect to the axial direction, a second axial surface parallel to the axial direction, and a first radial surface parallel to a radial direction of the pipe assembly, wherein the at least one load tooth includes, from a load tooth distal direction toward a load tooth proximal direction, a third axial surface parallel to the axial direction, a second ramped surface biased with respect to the axial direction, a fourth axial surface parallel to the axial direction, and a second radial surface parallel to the radial direction, wherein the first axial surface, the second axial surface, the third axial surface, and the fourth axial surface each have a radial height measured from the radially inner surface, and wherein the radial height of the fourth axial surface is greater than the radial height of the second axial surface, the radial height of the second axial surface is greater than the radial height of the first axial surface, and the radial height of the first axial surface is greater than the radial height of the third axial surface, and a female fitting, comprising: a body having a radially inner surface and a radially outer surface; a distal end and a proximal end; and an alignment cavity oriented closest to the proximal end on a removed portion of the radially inner surface, and at least one load cavity on the removed portion of the radially inner surface, wherein the alignment cavity includes, from an alignment cavity proximal direction toward an alignment cavity distal direction, a first axial surface parallel to the axial direction, a first ramped surface biased with respect to the axial direction, a second axial surface parallel to the axial direction, and a first radial surface parallel to the radial direction, wherein the at least one load cavity includes, from a load cavity proximal direction toward a load cavity distal direction, a third axial surface parallel to the axial direction, a second ramped surface biased with respect to the axial direction, a fourth axial surface parallel to the axial direction, and a second radial surface parallel to the radial direction, wherein the first axial surface, the second axial surface, the third axial surface, and the fourth axial surface each have a radial height measured from the radially outer surface, and wherein the radial height of the third axial surface is greater than the radial height of the first axial surface, the radial height of the first axial surface is greater than the radial height of the second axial surface, and the radial height of the second axial surface is greater than the radial height of the fourth axial surface, and when the male. fitting is fully engaged with the female fitting, the alignment tooth fits within the alignment cavity, and the load tooth fits within the load cavity.

BRIEF DESCRIPTION OF THE DRAWINGS

The accompanying figures, which are incorporated in and constitute a part of the specification, illustrate various example embodiments, and are used merely to illustrate various example embodiments. In the figures, like elements bear like reference numerals.

FIG. 311 illustrates a partial sectional view of female fitting 302.

FIG. 8 is a table illustrating TRI-LOC MT Joint Assembly forces during assembly of the male and female fittings.

DETAILED DESCRIPTION

Figure 1A:
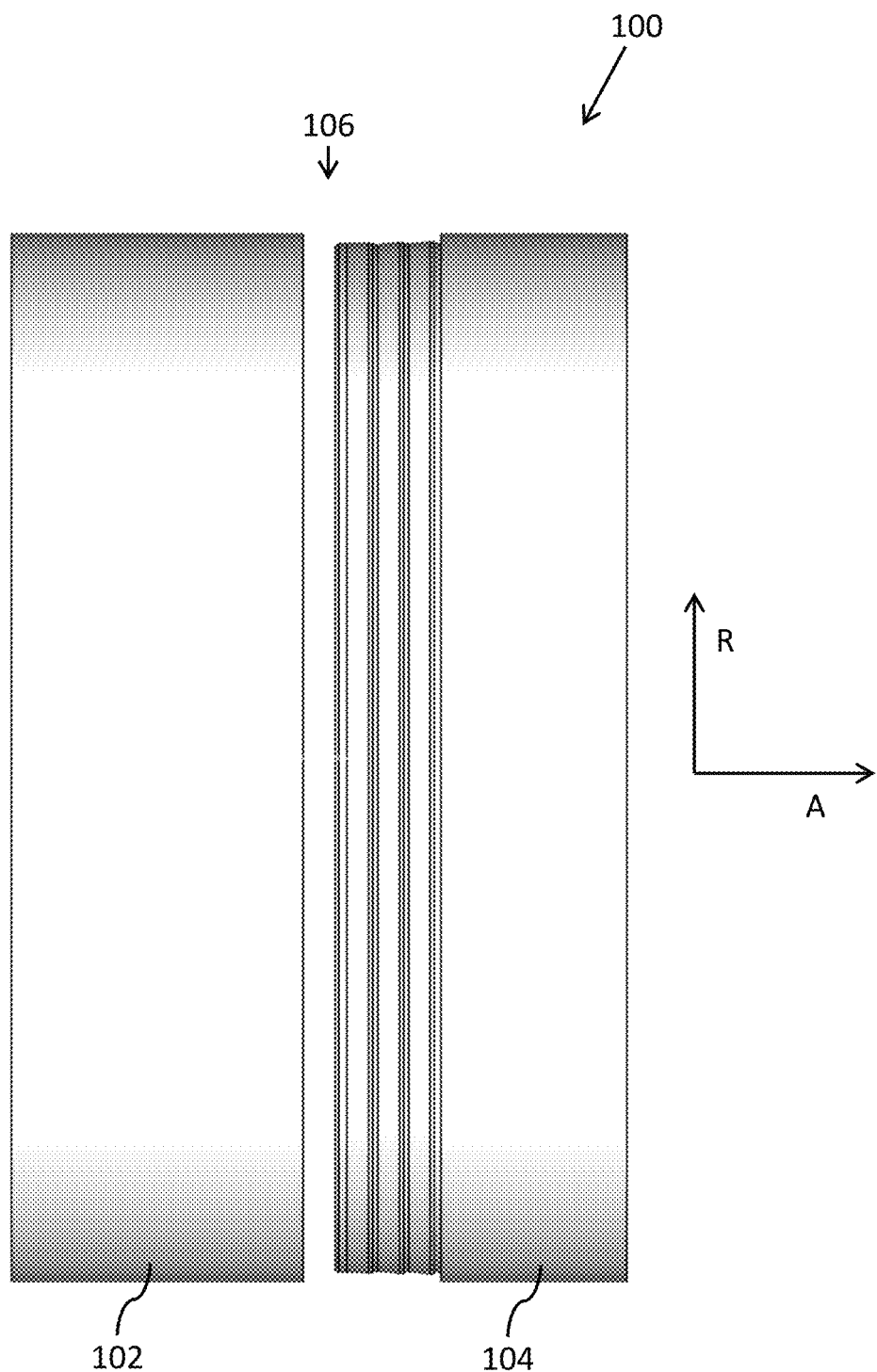
FIG. 1A illustrates an elevational view of a pipe assembly 100, including a female fitting 102 and a male fitting 104.
Figure 1B:
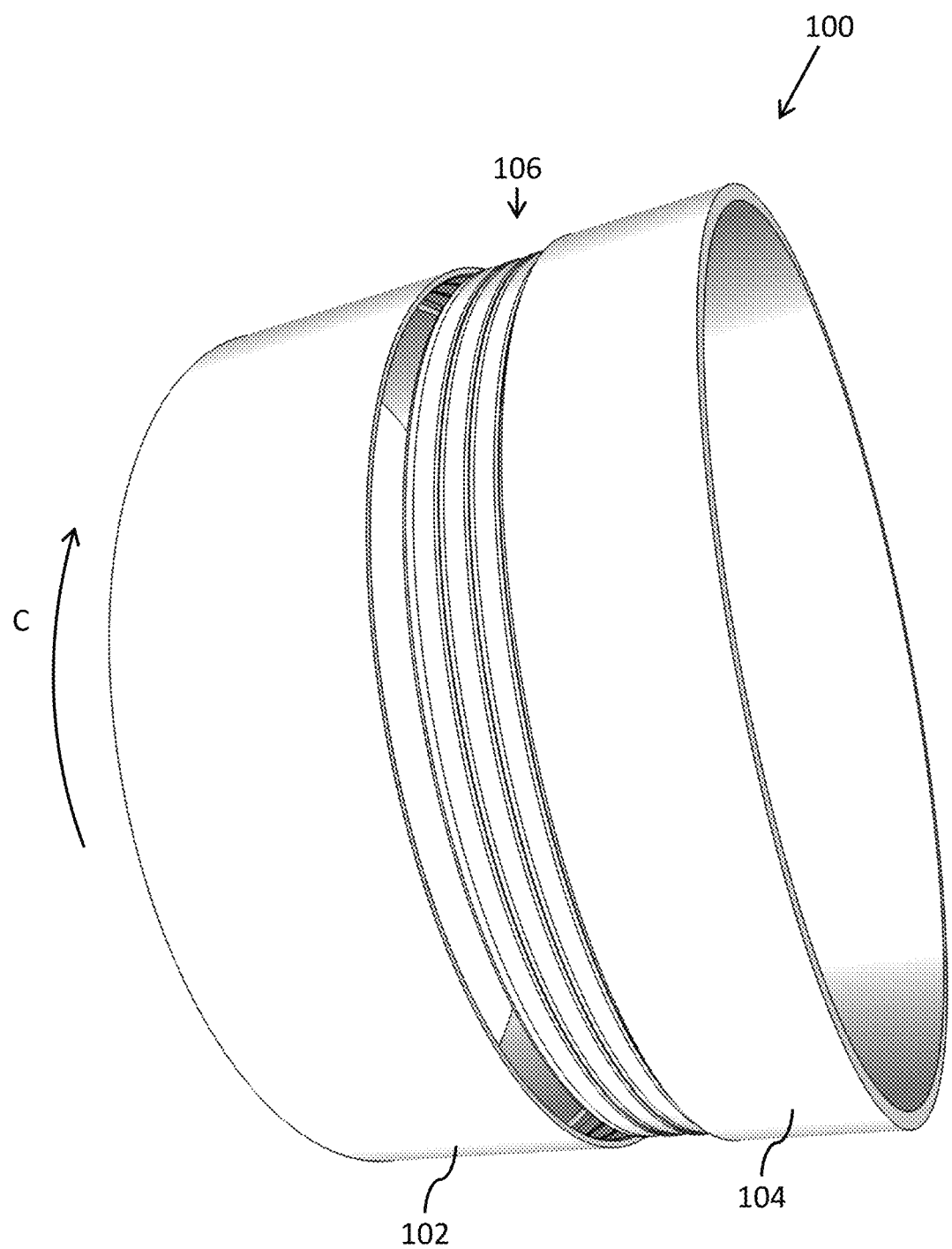
FIG. 1B illustrates a perspective view of pipe assembly 100, including female fitting 102 and male fitting 104.
Figure 1C:
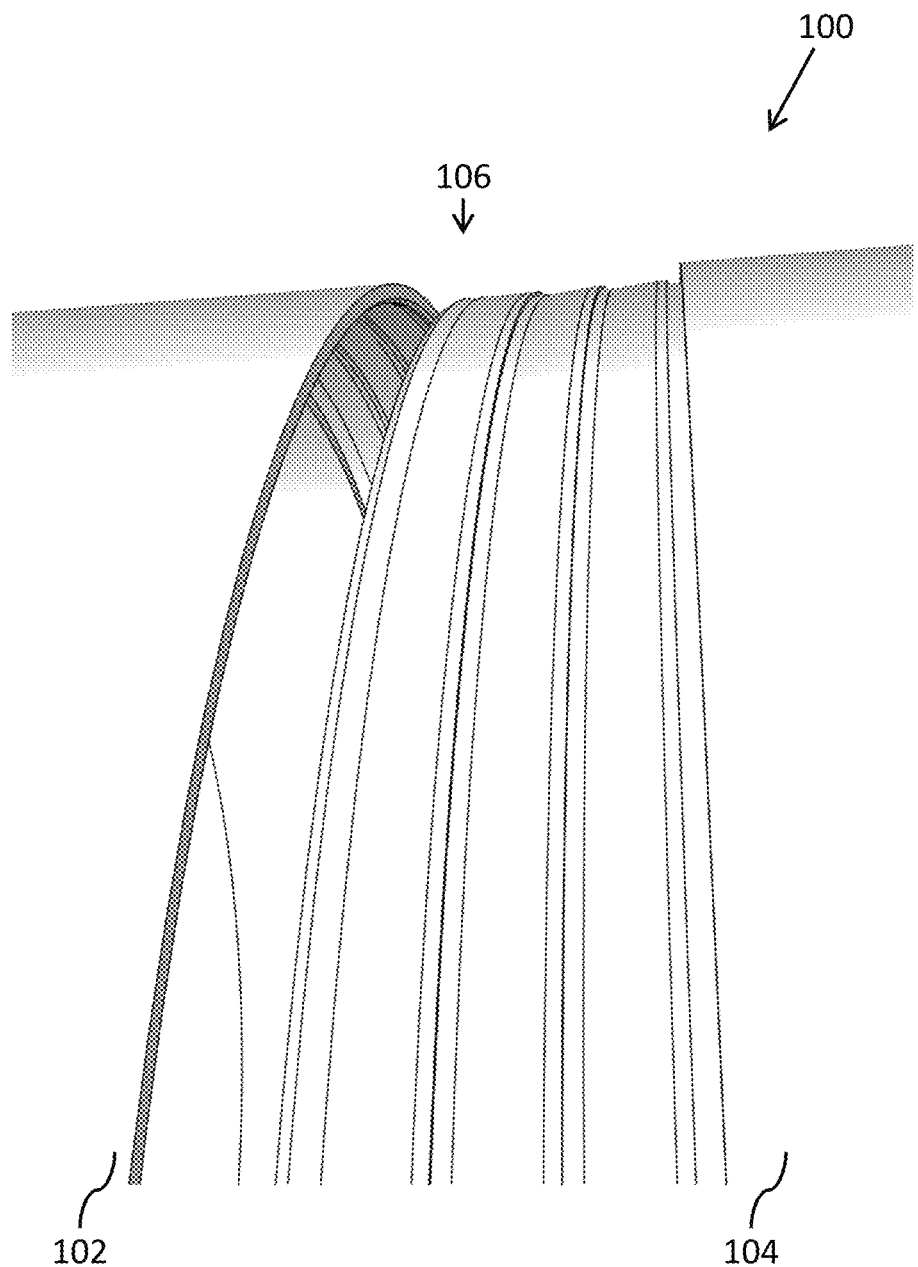
FIG. 1C illustrates a partial perspective view of pipe assembly 100, including female fitting 102 and male fitting 104.
Figure 1D:
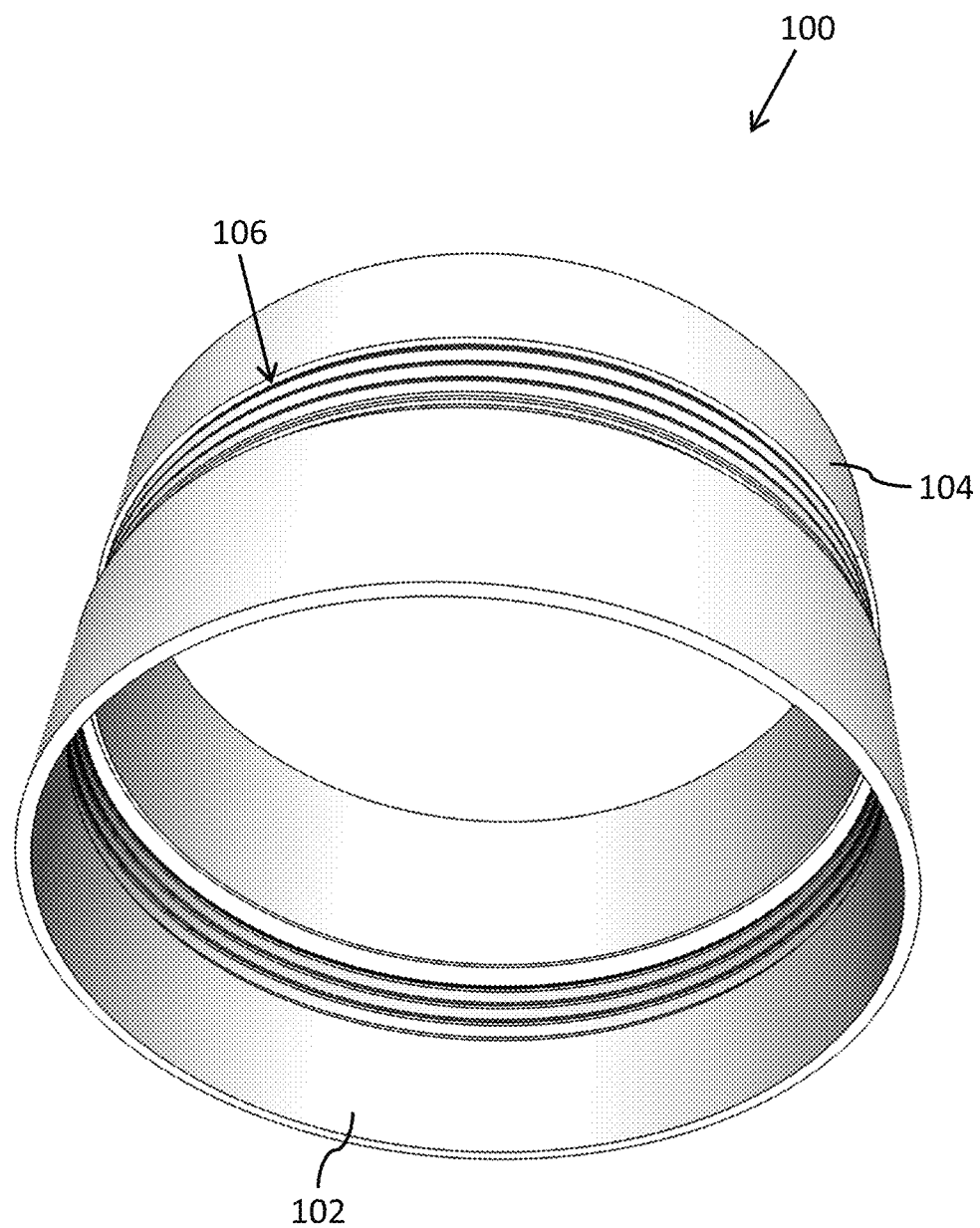
FIG. 1D illustrates a perspective view of pipe assembly 100, including female fitting 102 and male fitting 104.

FIGS. 1A-1D illustrate a pipe assembly 100, including a female fitting 102 and a male fitting 104. Female fitting 102 and male fitting 104 may engage one another at a junction 106.

As used throughout this application, the radial direction refers to direction R as illustrated in the drawings. Radially outer or radially outwardly refers to the direction R as the radius is increased, whereas radially inner or radially inwardly refers to the direction R as the radius is decreased. As used throughout this application, the axial direction refers to that extending along or parallel to direction A. The axial direction A is intended to extend along the longitudinal length of a pipe assembly. As used throughout this application, the circumferential direction refers to direction C, which extends about the circumference of the pipe assembly in a plane orthogonal to the axial direction A, and parallel to the radial direction R.

Female fitting 102 may include an annular portion of pipe having a radially inner side and a radially outer side. The radially inner side of female fitting 102 includes cavities at its distal end.

Male fitting 104 may include an annular portion of pipe having a radially inner side and a radially outer side. The radially outer side of male fitting 104 includes teeth at its distal end, corresponding to those of female fitting 102, as will be further described below.

At least one of female fitting 102 and male fitting 104 may be formed independently of a length of pipe, and may welded or otherwise mechanically fixed to the length of pipe at a proximal end of female fitting 102 and/or male fitting 104. This welding or mechanical attachment of female fitting 102 and/or male fitting 104 to a length of pipe may be performed away from the site of installation of the pipe, or on the site of installation of the pipe.

Alternatively, at least one of female fitting 102 and male fitting 104 may be machined directly into the ends of a length of pipe. The machining of female fitting 102 and male fitting 104 may be performed using known machining techniques.

While the drawings focus on the fittings fixing lengths of pipe to one another, rather than the lengths of pipe themselves, it is understood that the fittings are oriented at the ends of a length of pipe. In practice, a single length of pipe may include female fitting 102 at a first end, and male fitting 104 at a second end. In this manner, a series of like lengths of pipe may be fit together, with the female end of a first length of pipe engaging the male end of a second length of pipe, while the male end of the first length of pipe engages the female end of a third length of pipe.

Alternatively, a single length of pipe may include female fitting 102 at both its first ends and second ends, or may include male fitting 104 at both its first ends and second ends. In this manner, the independent lengths of pipe would be either "male" lengths (with male fitting 104 at each end), or "female" lengths (with female fitting 102 at each end). Assembling a pipeline using these lengths of pipe would require alternating between male lengths and female lengths during assembly of the pipeline.

Female fitting 102 and male fitting 104 may be made of any of a variety of materials, including without limitation, a metal (such as steel), an alloy, a polymer, a composite, and the like. In order for female fitting 102 and male fitting 104 to deflect enough relative to one another during the press-fitting of the two together, the material may need appropriate elastic qualities.

Lengths of pipe used in association with female fitting 102 and male fitting 104 may include any of a variety of lengths convenient for manufacture, transport, and assembly.

Diameters of lengths of pipe used in association with female fitting 102 and male fitting 104, and thus the diameters of female fitting 102 and male fitting 104, can be any of a variety of diameters. For example, the pipe and fittings may have outer diameters between about 6 in. (15 cm) and 127 in. (323 cm). The pipe and fittings may have outer diameters outside this range as well.

Figures 2A, 2B:
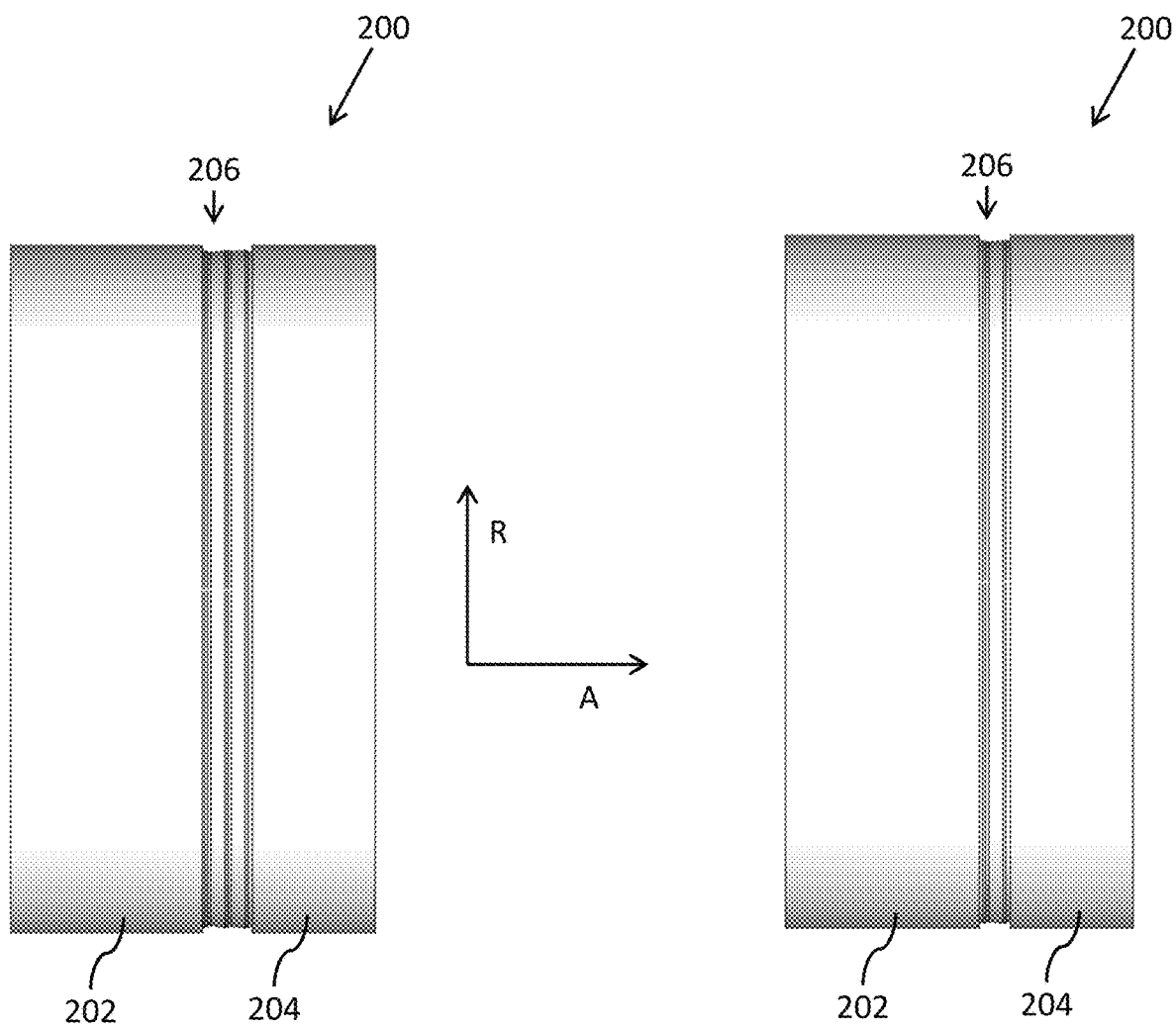
FIG. 2A illustrates an elevational view of a pipe assembly 200, including a female fitting 202 and a male fitting 204, during the process of joining the pipes to one another.
FIG. 2B illustrates an elevational view of pipe assembly 200, including female fitting 202 and male fitting 204, during the process of joining the pipes to one another.
Figures 2C, 2D:
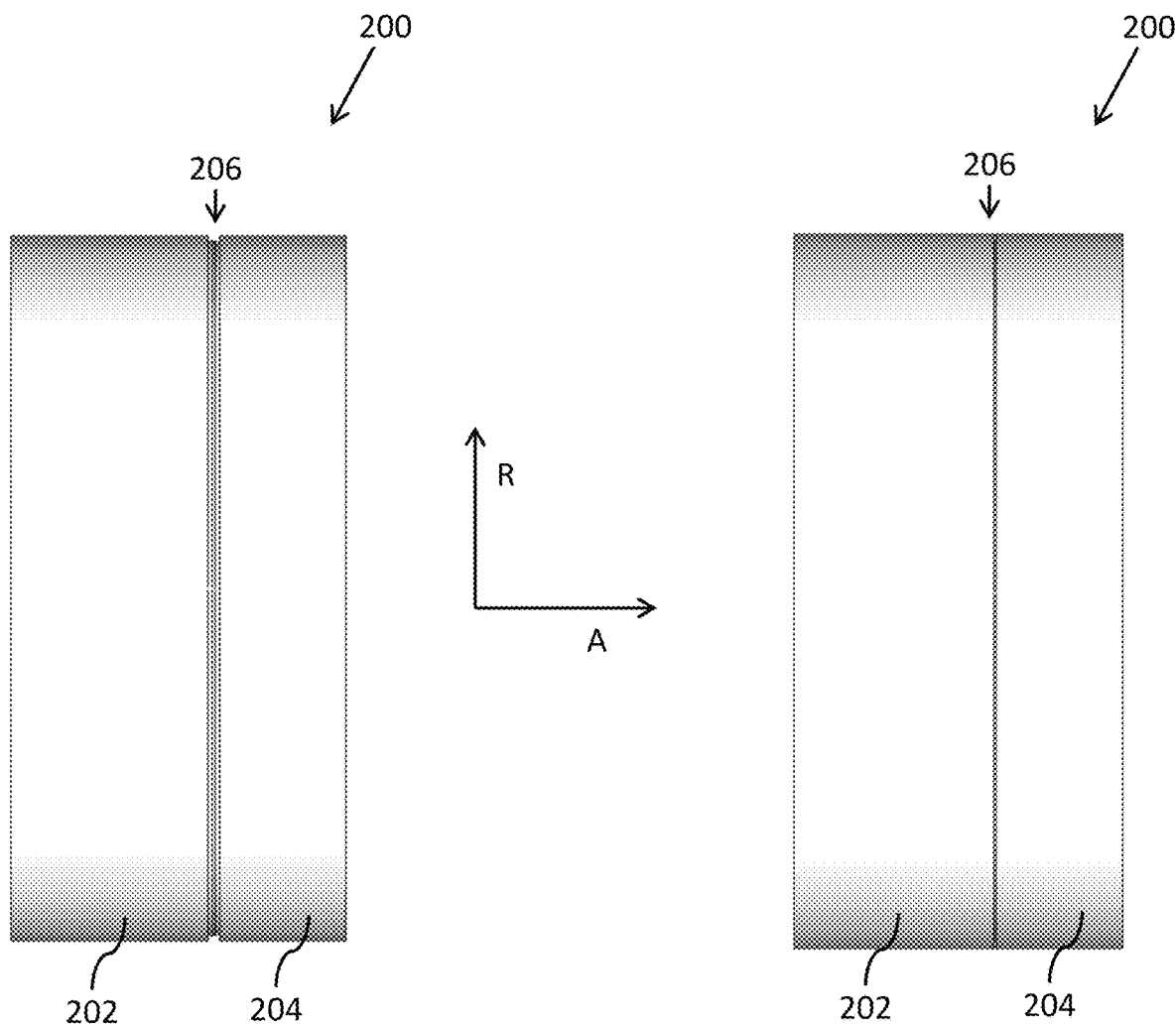
FIG. 2C illustrates an elevational view of pipe assembly 200, including female fitting 202 and male fitting 204, during the process of joining the pipes to one another.
FIG. 2D illustrates an elevational view of pipe assembly 200, including female fitting 202 and male fitting 204, with the fittings engaged to one another.
Figure 2E:
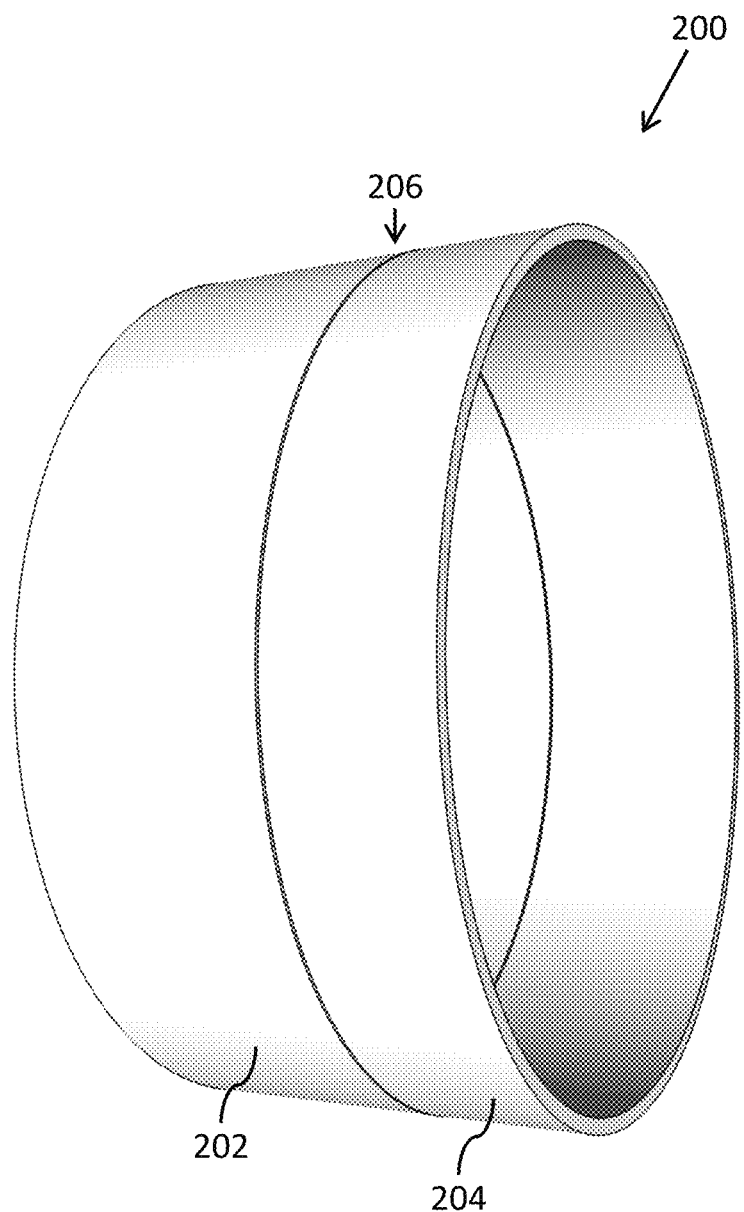
FIG. 2E illustrates a perspective view of pipe assembly 200, including female fitting 202 and male fitting 204, with the fittings engaged to one another.
Figure 2F:
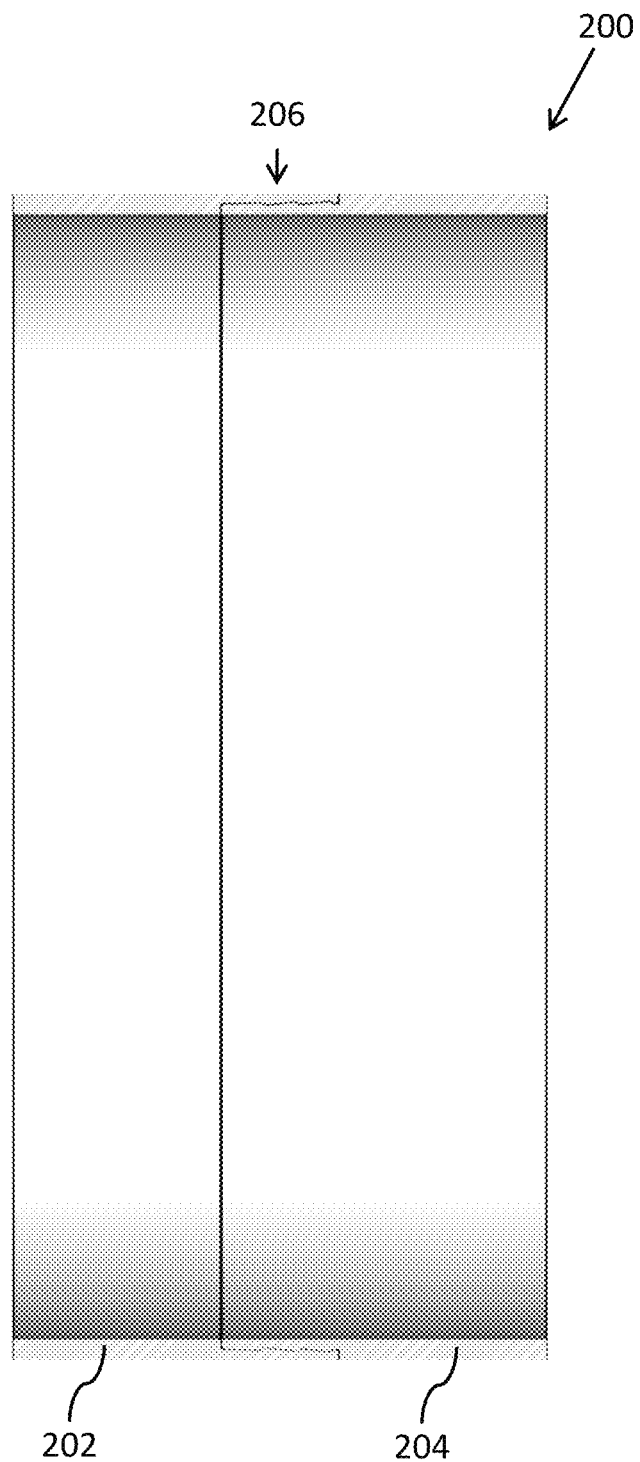
FIG. 2F illustrates a sectional view of pipe assembly 200, including female fitting 202 and male fitting 204, with the fittings engaged to one another.

FIGS. 2A-2C illustrate a pipe assembly 200, including a female fitting 202 and a male fitting 204, during the process of joining the pipes to one another. FIGS. 2D-2G illustrate pipe assembly 200 with female fitting 202 and male fitting 204 engaged to one another, and thus the pipes joined to one another. Assembly 200 includes a junction 206.

As illustrated in FIGS. 2A-2C, female fitting 202 and male fitting 204, are aligned insomuch as the distal end of male fitting 204 is concentric with and at least partially underlapping with the distal end of female fitting 202. As female fitting 202 and male fitting 204 are forced axially together, the corresponding cavities/teeth of each fitting begin to slide past one another until the fittings are fully seated, at which point the cavities/teeth engage one another completely.

Figure 2G:
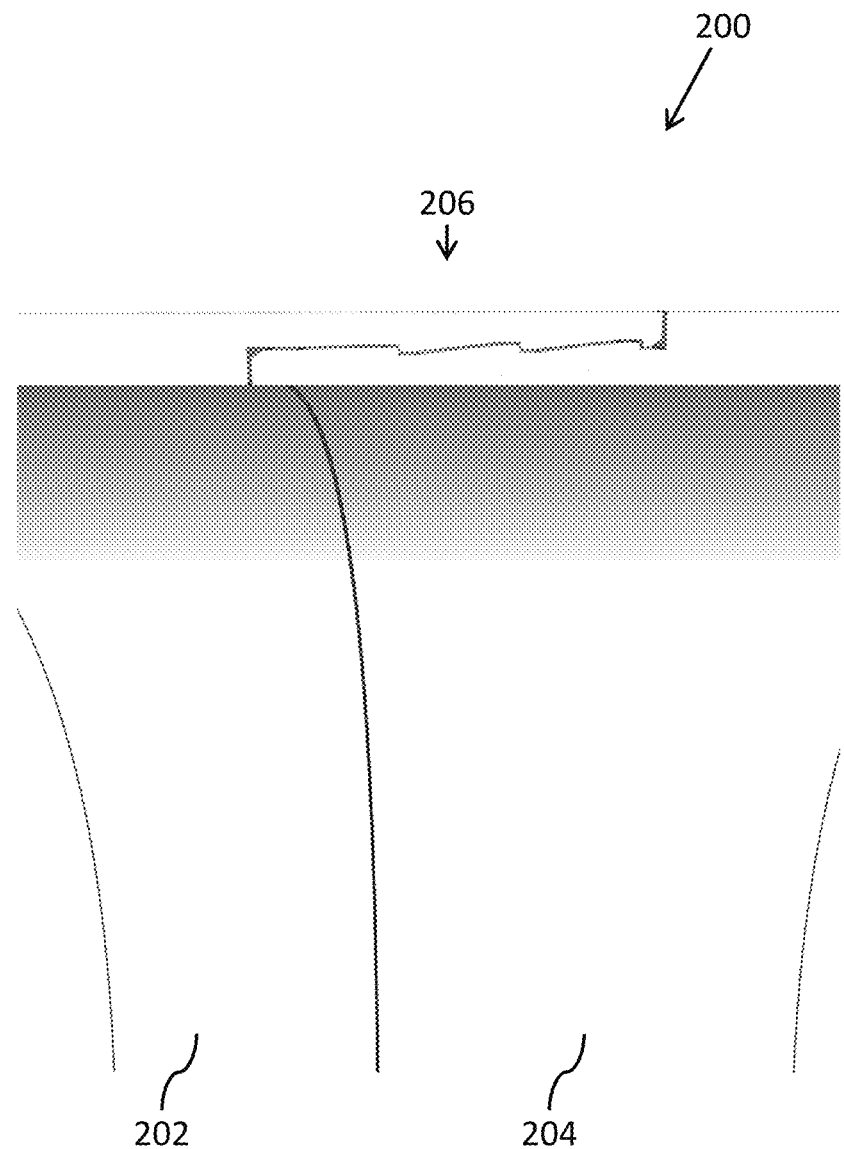
FIG. 2G illustrates a partial sectional view of pipe assembly 200, including female fitting 202 and male fitting 204, with the fittings engaged to one another.

As most clearly illustrated in FIG. 2G, the corresponding cavities/teeth of female fitting 202 and male fitting 204 engage one another in a "positive/negative" manner. That is, the teeth of male fitting 204 correspond to similarly shaped cavities of female fitting 202, the cavities being essentially negatives of the teeth. A small gap may be oriented along the entire junction, or along at least a portion of the junction.

During assembly of female fitting 202 and male fitting 204 to engage one another, a lubricant may be applied to one or both of female fitting 202 and male fitting 204.

During assembly of female fitting 202 and male fitting 204 to engage one another, a sealant may be applied to one or both of female fitting 202 and male fitting 204.

Figure 3A:
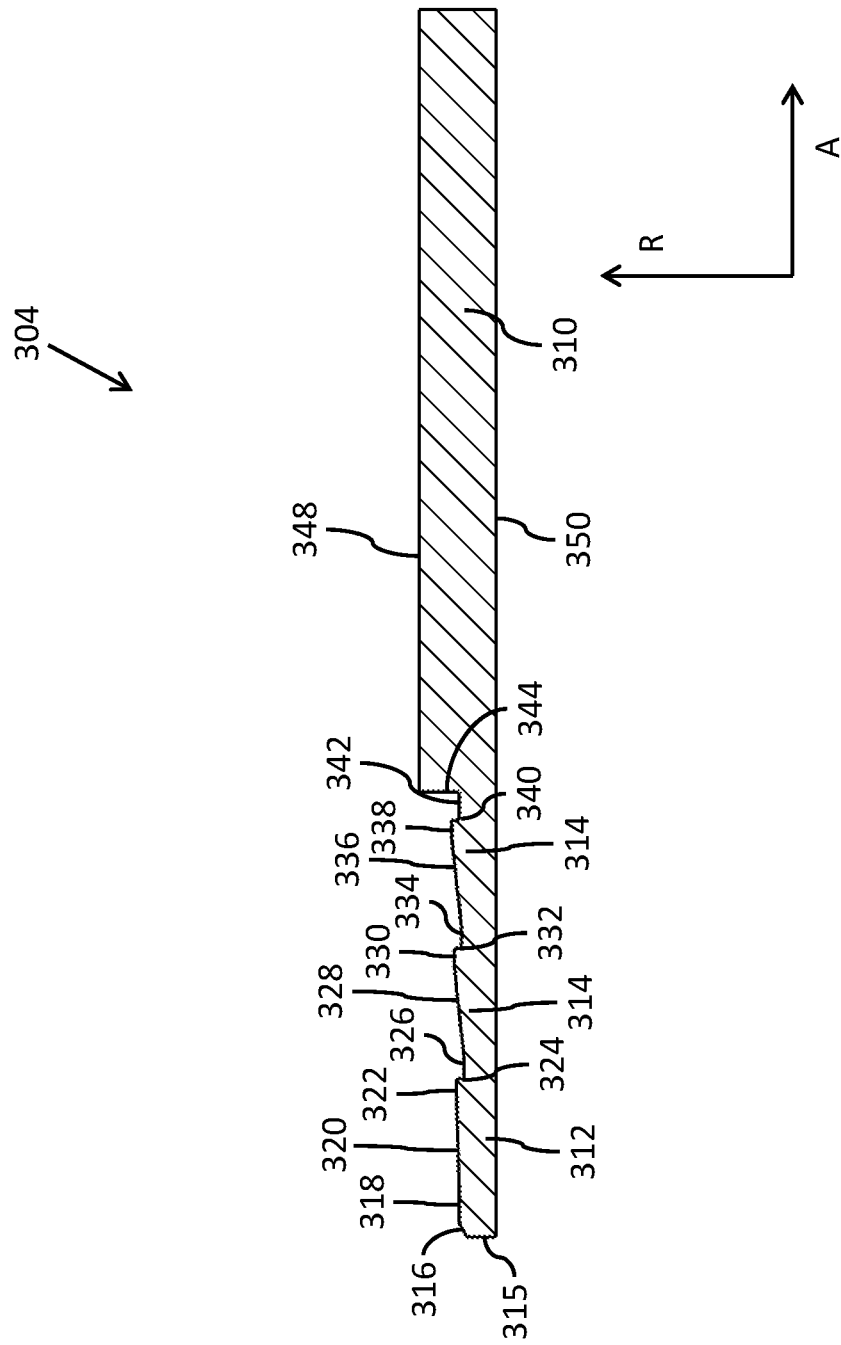
FIG. 3A illustrates a partial sectional view of a male fitting 304.

FIG. 3A illustrates a partial sectional view of a male fitting 304. Male fitting may include a body 310. Male fitting 304 may include three teeth, including an alignment tooth 312 and two load teeth 314, each formed by cutaway portions of body 310. Male fitting 304 may include an alignment tooth 312 and at least one load tooth 314. Body 310 may include a radially outer surface 348 and a radially inner surface 350, where alignment tooth 312 and at least one load tooth 314 are formed on a removed portion of radially outer surface 348. Male fitting 304 may include a distal end and a proximal end. Each of alignment tooth 312 and at least one load tooth 314 may include a distal direction (toward the distal end of male fitting 304) and a proximal direction (away from the distal end of male fitting 304).

The following description of male fitting 304 focuses upon the features of the radially outer surface of male fitting 304, and describes these as the profile of a sectional view of male fitting 304.

Male fitting 304 may include a radial distal surface 315, and may include a beveled alignment surface 316. Beveled alignment surface 316 may be biased relative to both radial direction R and axial direction A. Beveled alignment surface 316 may aid in the guiding of male fitting 304 into female fitting 302 (which may include a corresponding beveled alignment surface 366).

Alignment tooth 312 is oriented first when counting the teeth starting at the distal end of male fitting 304. As will be further described below, alignment tooth 312 includes a first ramped surface 320 having an angle that is shallower than that of load teeth 314. Alignment tooth includes a first axial surface 318, which may be parallel to axial direction A, and which may extend from beveled alignment surface 316 if present. First axial surface 318 extends to first ramped surface 320. First ramped surface 320 is biased with respect to axial direction A, as will be further described below. First ramped surface 320 extends to second axial surface 322, which may be parallel to axial direction A. Alignment tooth 312 terminates with a first radial surface 324, which may be parallel to radial direction R.

Moving proximally from alignment tooth 312, male fitting 304 includes at least one load tooth 314. In the drawings, two load teeth 314 are illustrated. Extending from first radial surface 324, first load tooth 314 includes a third axial surface 326, which may be parallel to axial direction A. Extending from third axial surface 326 is a second ramped surface 328, which is biased with respect to axial direction A, as will be further described below. Finally, extending from second ramped surface 328 is a fourth axial surface 330, which may be parallel to axial direction A. First load tooth 314 terminates with a second radial surface 332, which may be parallel to radial direction R.

Moving proximally from first load tooth 314 may be a second load tooth 314. Extending from second radial surface 332 is a fifth axial surface 334, which may be parallel to axial direction A. Extending from fifth axial surface 334 is a third ramped surface 336, which is biased with respect to axial direction A, as will be further described below. Finally, extending from third ramped surface 336 is a sixth axial surface 338, which may be parallel to axial direction A. Second load tooth 314 terminates with a third radial surface 340, which may be parallel to radial direction R.

Male fitting 304 may include a seventh axial surface 342 extending from third radial surface 340 and extending to a radial proximal surface 344.

Body 310 of male fitting 304 may include a radially outer surface 348, into which is machined the aforementioned teeth. Body 310 may include a radially inner surface 350, which may extend along the entire length of male fitting 304 uninterrupted.

Figure 3B:
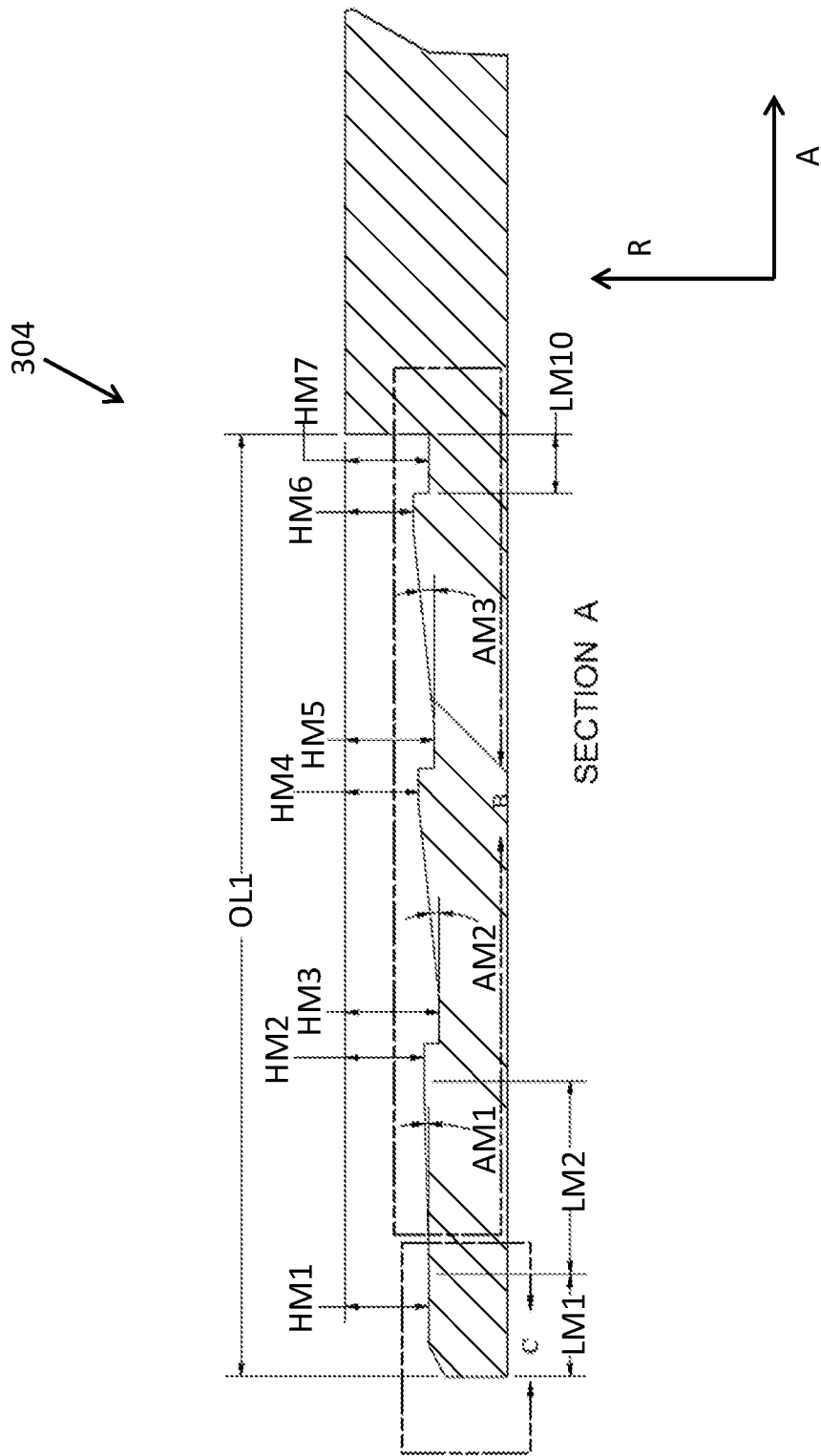
FIG. 3B illustrates a partial sectional view of male fitting 304.
Figure 3C:
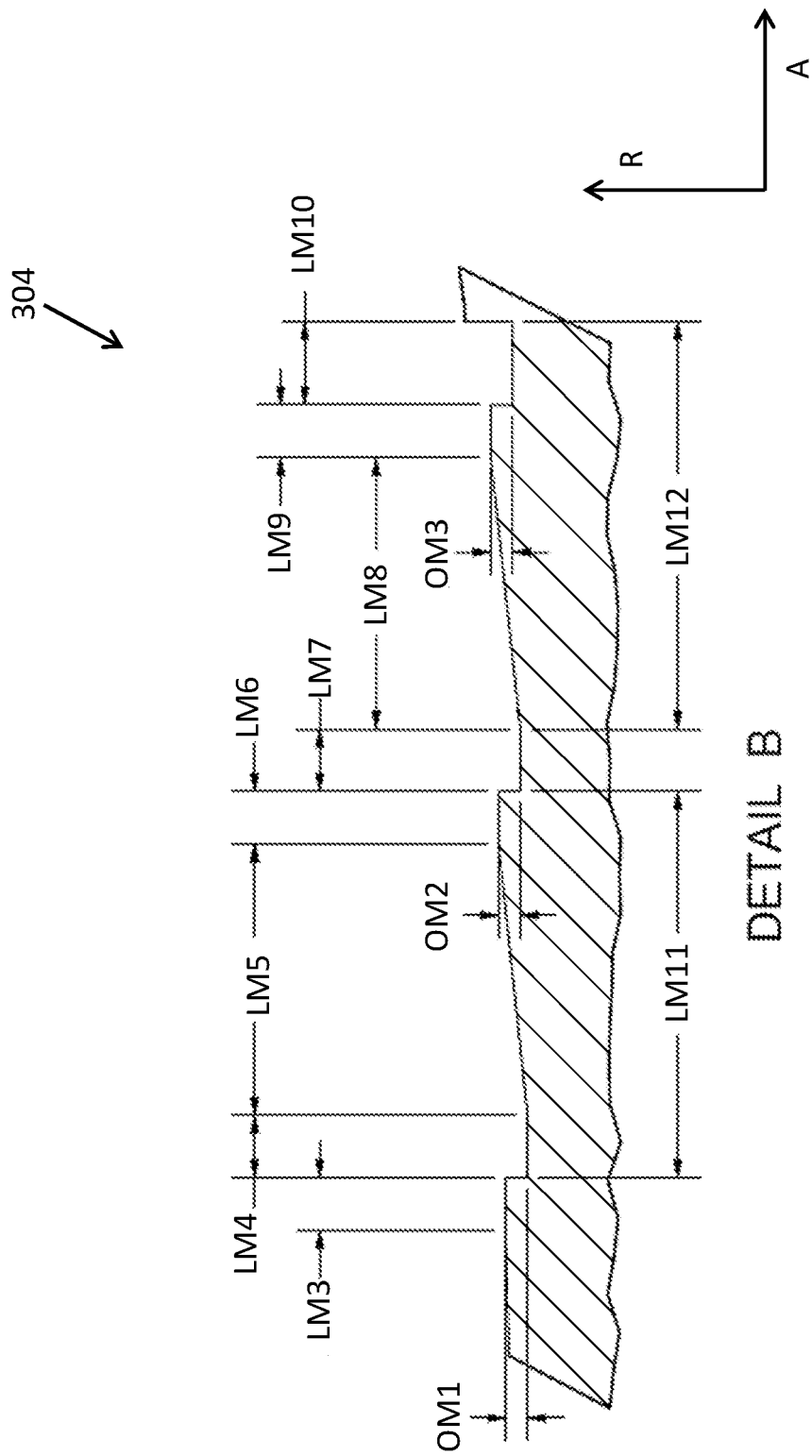
FIG. 3C illustrates a partial sectional view of male fitting 304.
Figure 3D:
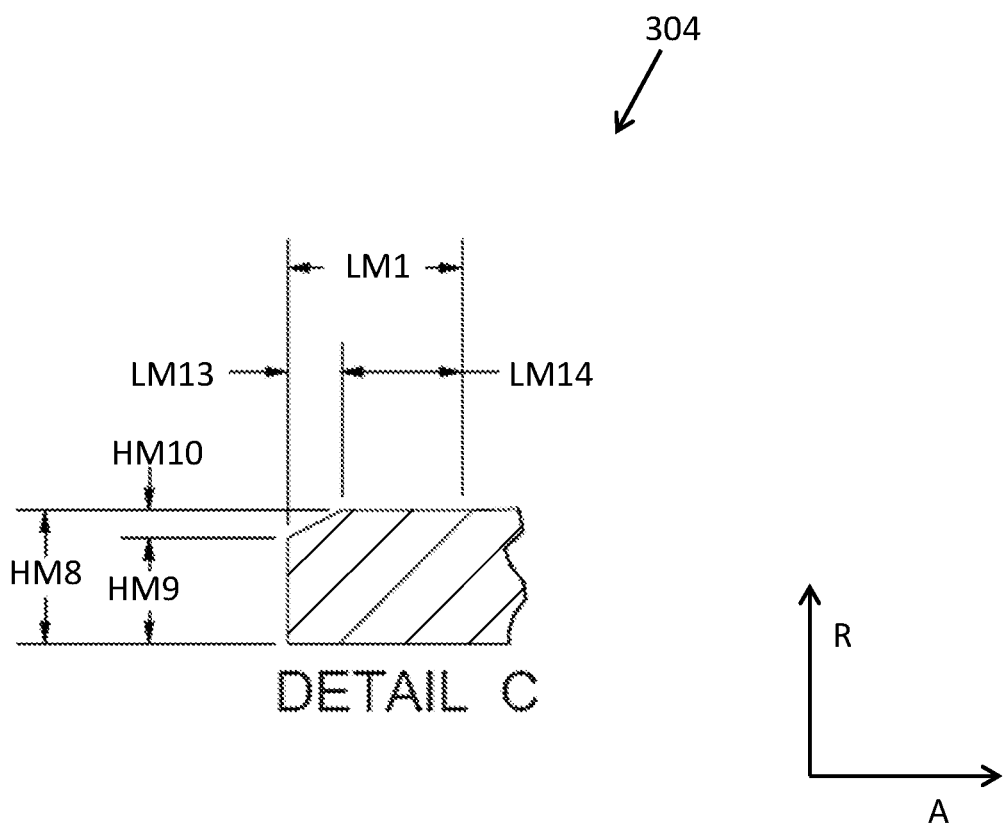
FIG. 3D illustrates a partial sectional view of male fitting 304.

FIG. 3B-3D illustrate various dimensions associated with the profile of male fitting 304.

With specific reference to FIG. 3B, LM1 is the axial length of alignment tooth 312 extending from the junction of first axial surface 318 and first ramped surface 320, to radial distal surface 315. Height HM1 is the radial height from radially outer surface 348 to first axial surface 318. LM2 is the axial length of first ramped surface 320. Angle AM1 is the angle of first ramped surface 320 relative to axial direction A. Height HM2 is the radial height from radially outer surface 348 to second axial surface 322. Height HM3 is the radial height from radially outer surface 348 to third axial surface 326. Angle AM2 is the angle of second ramped surface 328 relative to axial direction A. Height HM4 is the radial height from radially outer surface 348 to fourth axial surface 330. Height HM5 is the radial height from radially outer surface 348 to fifth axial surface 334. Angle AM3 is the angle of third ramped surface 336 relative to axial direction A. Height HM6 is the radial height from radially outer surface 348 to sixth axial surface 338. Height HM7 is the radial height from radially outer surface 348 to seventh axial surface 342. LM10 is the axial length of seventh axial surface 342. Length OL1 is the overall axial length of male fitting 304.

With specific reference to FIG. 3C, OM1 is the radial height of first radial surface 324, OM2 is the radial height of second radial surface 332, and 0M3 is the radial height of third radial surface 340. LM3 is the axial length of second axial surface 322. LM4 is the axial length of third axial surface 326. LM5 is the axial length of second ramped surface 328. LM11 is the axial length of first load tooth 314, which may be the same as the axial length of second load tooth 314 (and any additional load teeth 314 that are not illustrated. LM6 is the axial length of fourth axial surface 330. LM7 is the axial length of fifth axial surface 334. LM8 is the axial length of third ramped surface 336. LM9 is the axial length of sixth axial surface 338. LM10 is the axial length of seventh axial surface 342. LM12 is the axial length of third ramped surface 336, sixth axial surface 338, and seventh axial surface 342, combined.

With specific reference to FIG. 3D, HM9 is the radial height of radial distal surface 315. HM8 is the radial height of radial distal surface 315 combined with beveled alignment surface 316, or stated differently, HM8 is the radial height from radially inner surface 350 to first axial surface 318. HM10 is the radial height of beveled alignment surface 316. LM1 is the axial length between the junction of first axial surface 318 and first ramped surface 320, to radial distal surface 315. LM13 is the axial length of beveled alignment surface 316. LM14 is the axial length of first axial surface 318.

Male fitting 304, as discussed, includes a number of surfaces forming its radially outer profile, including radial surfaces, axial surfaces, and ramped surfaces. The relationship of specific surfaces results in in the unexpected results of male fittings 304 and female fittings 302 that are easier to align without bucking, require less force to place into engagement with one another, and results in a stronger union of male and female fittings capable of withstanding great compressive stresses, tensile stresses, and bending stresses.

Specifically, angle AM1 is much smaller than angles AM2 and AM3. Angles AM2 and AM3 may be the same angle. Angle AM1 may be between 20% and 25% of angles AM2 and AM3. Angle AM1 may be 23.7% of angles AM2 and AM3. Angle AM1 may be about 23.7% of angles AM2 and AM3. Decreasing angle AM1 may allow for a "slower" loading of necessary forces required to initially align and partially insert male fitting 304 into female fitting 302.

The radial height HM1 and axial length LM14 of first axial surface 118 permits male fitting 304 to be inserted into female fitting 302 an initial distance with minimal force, or relatively little force, ensuring that the fittings are aligned before greater forces are required to engage the fittings with one another completely. This initial distance may be, for example, about 0.4 in. (1.0 cm).

The heights of ramped surfaces 320, 328, and 336 relative to one another provides an advantage in both engaging male fitting 304 inside female fitting 302, and increasing the strength of the union, effectively requiring one or both of male fitting 304 and female fitting 302 to be destroyed to separate them from one another. The radial heights of the axially central points of ramped surfaces may be arranged such that ramped surface 336 is the radially outermost of the three, ramped surface 328 is the radially innermost of the three, and ramped surface 320 has a height radially between ramped surfaces 328 and 336.

The heights of axial surfaces 318, 322, 326, 330, 334, 338, and 342 relative to one another provides an advantage in both engaging male fitting 304 inside female fitting 302, and increasing the strength of the union, effectively requiring one or both of male fitting 304 and female fitting 302 to be destroyed to separate them from one another. The radial heights of the axial surfaces, in order from greatest to smallest, are: HM3, HM5, HM1 and HM7 (equal), HM2, HM4, and HM6. As these heights are measured radially from radially outer surface 348, it is worth noting that the height of each of these axial surfaces when measured from radially inner surface 350, in order from smallest to greatest, are: third axial surface 326, fifth axial surface 334, first axial surface 318 and seventh axial surface 342 (equal), second axial surface 322, fourth axial surface 330, and sixth axial surface 338. Thus, the orientation and dimensions of male fitting 304 and female fitting 302 provide unexpected results, particularly in that first axial surface 318 is not the radially shortest of all of the axial surfaces.

Figure 3E:
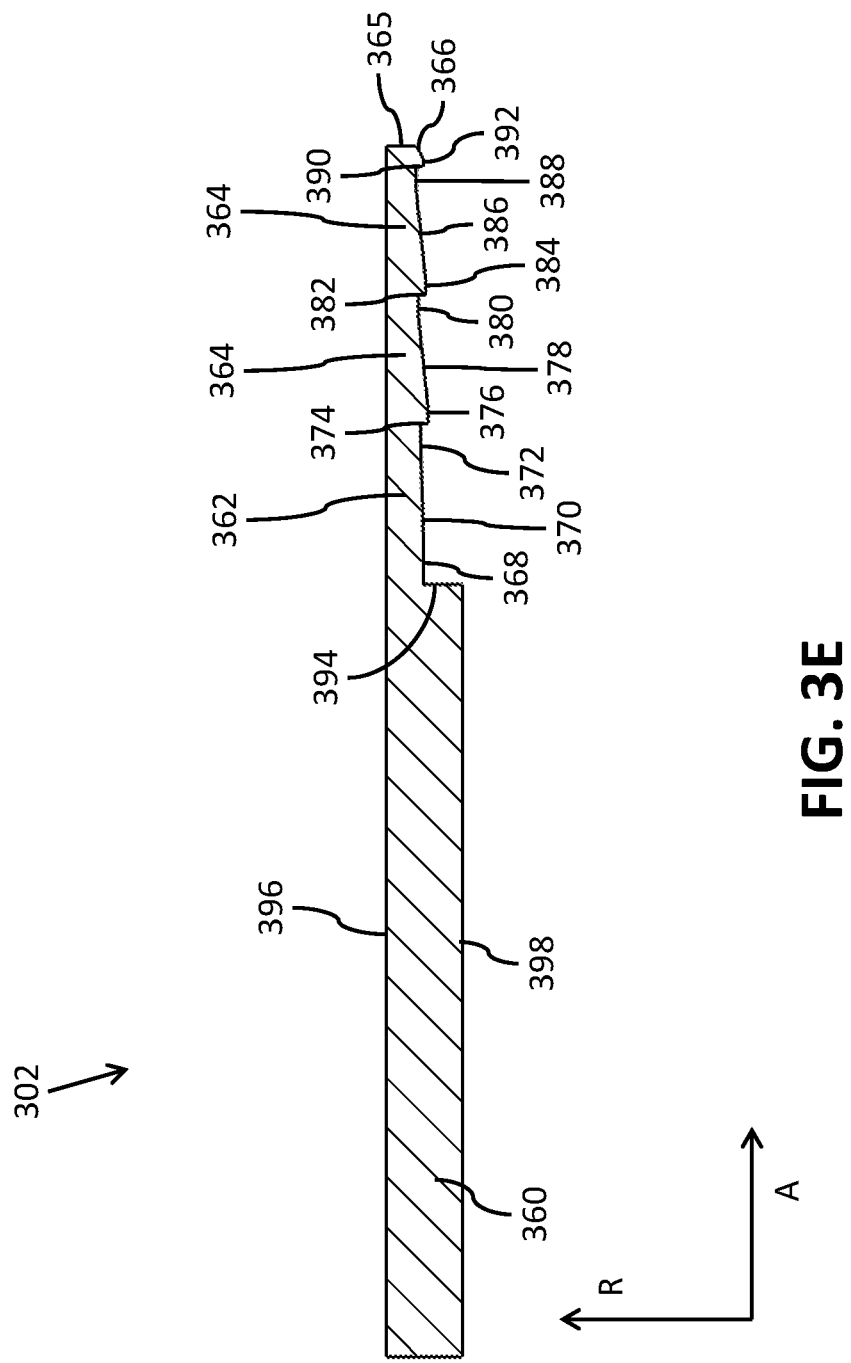
FIG. 3E illustrates a partial sectional view of a female fitting 302.

FIG. 3E illustrates a partial sectional view of a female fitting 302. Female fitting 302 may include a body 360. Female fitting 302 may include three cavities corresponding to the three teeth of male fitting 304, including an alignment cavity 362 and two load cavities 364, each formed by cutaway portions of body 360. Female fitting 302 may include an alignment cavity 362 and at least one load cavity 364. Body 360 may include a radially outer surface 396 and a radially inner surface 398, where alignment cavity 362 and at least one load cavity 364 are formed on a removed portion of radially inner surface 398. Female fitting 302 may include a distal end and a proximal end. Each of alignment cavity 362 and at least one load cavity 364 may include a distal direction (toward the distal end of female fitting 302) and a proximal direction (away from the distal end of female fitting 302).

The following description of female fitting 302 focuses upon the features of the radially inner surface of female fitting 302, and describes these as the profile of a sectional view of female fitting 302.

Female fitting 302 may include a radial distal surface 365, and may include a beveled alignment surface 366. Beveled alignment surface 366 may be biased relative to both radial direction R and axial direction A. Beveled alignment surface 366 may aid in the guiding of female fitting 302 onto male fitting 304 (which may include a corresponding beveled alignment surface 316).

Alignment cavity 362 is oriented last when counting the cavities starting at the distal end of female fitting 302. That is, alignment cavity 362 is the proximal-most cavity of female fitting 302. As will be further described below, alignment cavity 362 includes a first ramped surface 370 having an angle that is shallower than that of load cavities 364. Alignment cavity 362 includes a first axial surface 368, which may be parallel to axial direction A, and which extends between a radial proximal surface 394 and first ramped surface 370. First ramped surface 370 is biased with respect to axial direction A, as will be further described below. First ramped surface 370 extends to second axial surface 372, which may be parallel to axial direction A. Alignment cavity 362 terminates with a first radial surface 374, which may be parallel to radial direction R.

Moving distally from alignment cavity 362, female fitting 302 includes at least one load cavity 364. In the drawings, two load cavities 364 are illustrated. Extending from first radial surface 374, first load cavity 364 includes a third axial surface 376, which may be parallel to axial direction A. Extending from third axial surface 376 is a second ramped surface 378, which is biased with respect to axial direction A, as will be further described below. Finally, extending from second ramped surface 378 is a fourth axial surface 380, which may be parallel to axial direction A. First load cavity 364 terminates with a second radial surface 382, which may be parallel to radial direction R.

Moving distally from first load cavity 364 may be a second load cavity 364. Extending from second radial surface 382 is a fifth axial surface 384, which may be parallel to axial direction A. Extending from fifth axial surface 384 is a third ramped surface 386, which is biased with respect to axial direction A, as will be further described below. Finally, extending from third ramped surface 386 is a sixth axial surface 388, which may be parallel to axial direction A. Second load cavity 364 terminates with a third radial surface 390, which may be parallel to radial direction R.

Female fitting 302 may include a seventh axial surface 392 extending from third radial surface 390, and extending to beveled alignment surface 366, if present, or directly to radial distal surface 365 if beveled alignment surface 366 is not present.

Body 360 of female fitting 302 may include a radially outer surface 396, which may extend along the entire length of female fitting 302 uninterrupted. Body 360 may include a radially inner surface 398, into which is machined the aforementioned cavities.

Figure 3F:
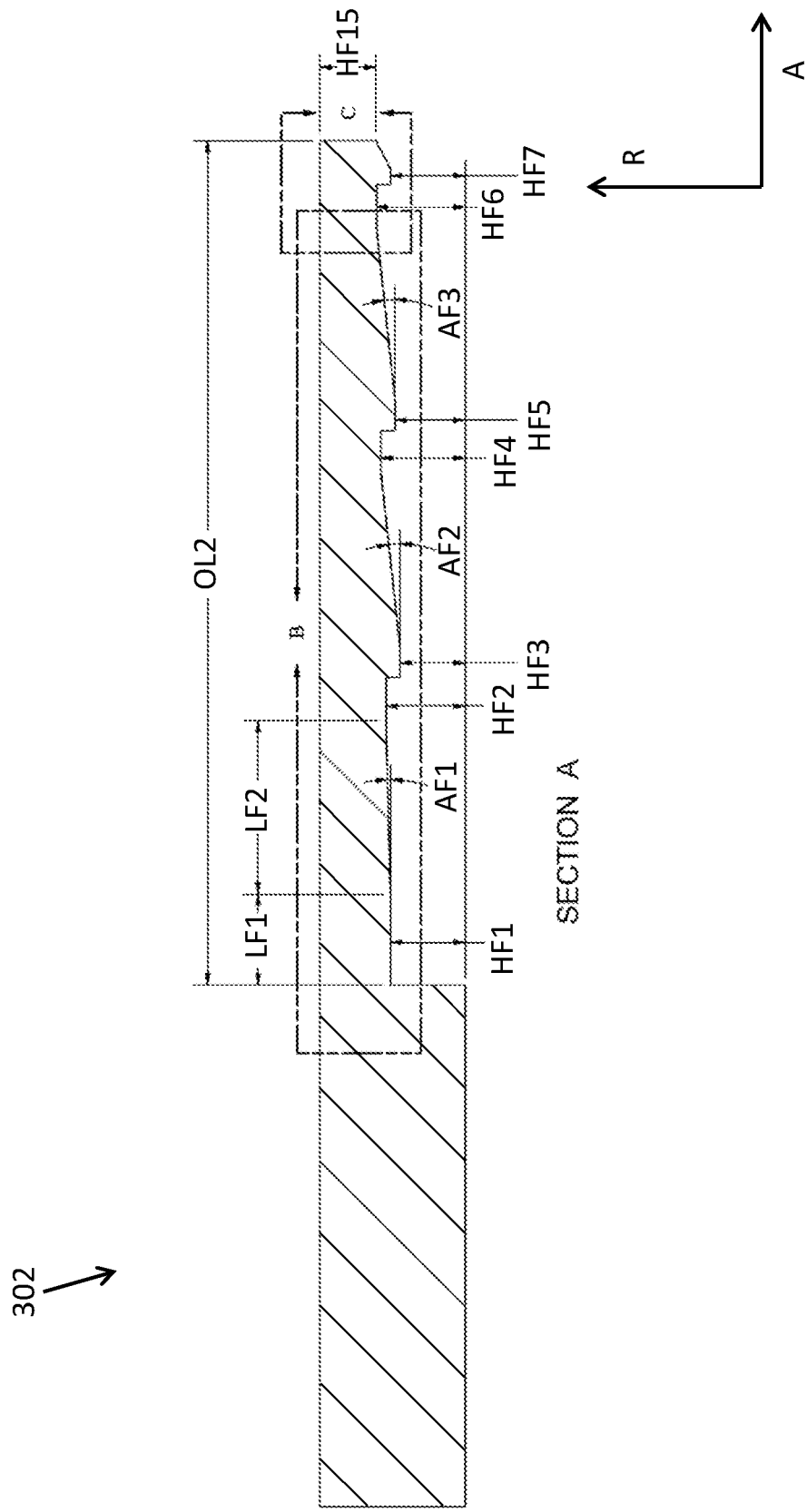
FIG. 3F illustrates a partial sectional view of female fitting 302.
Figure 3G:
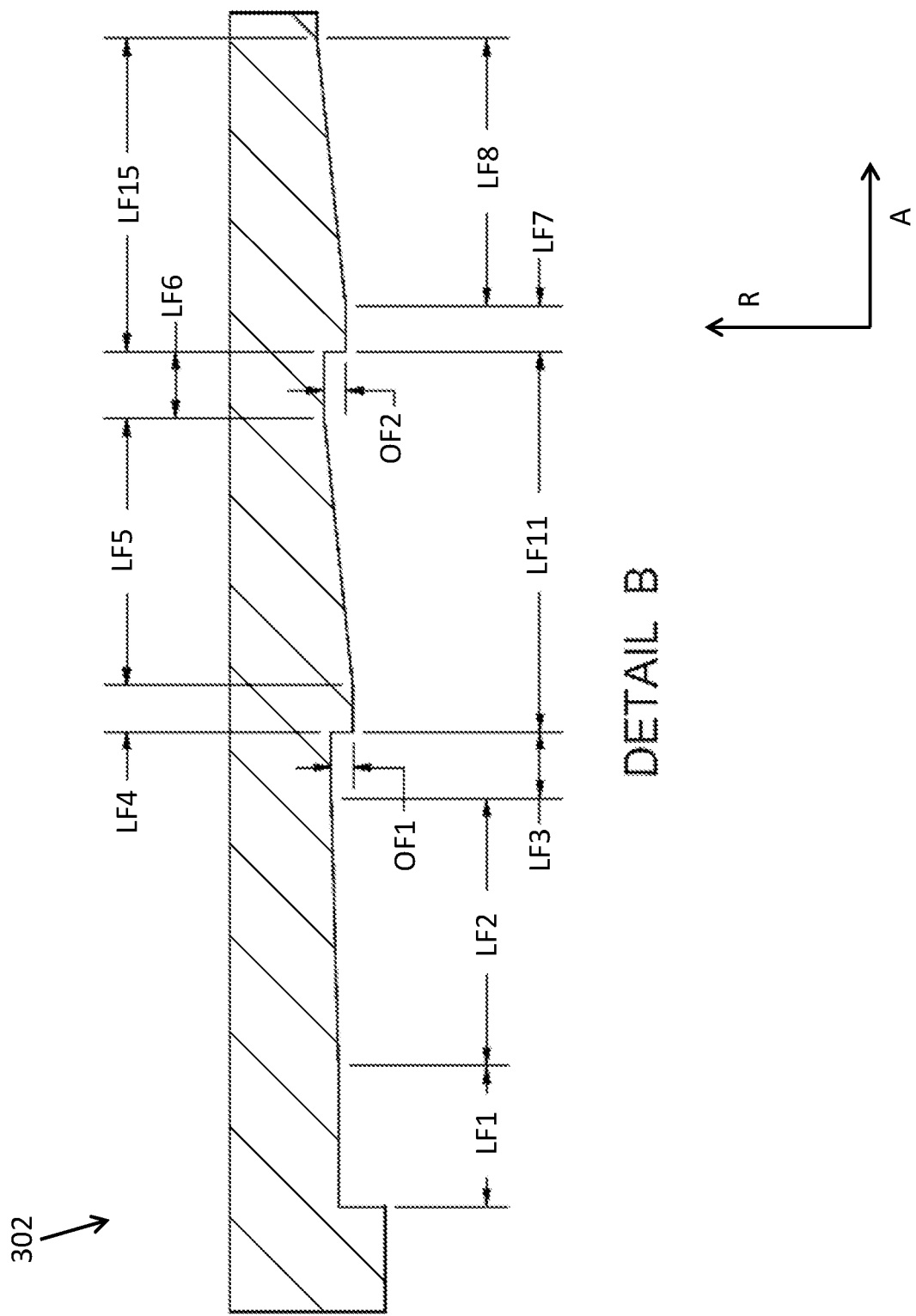
FIG. 3G illustrates a partial sectional view of female fitting 302.
Figure 3H:
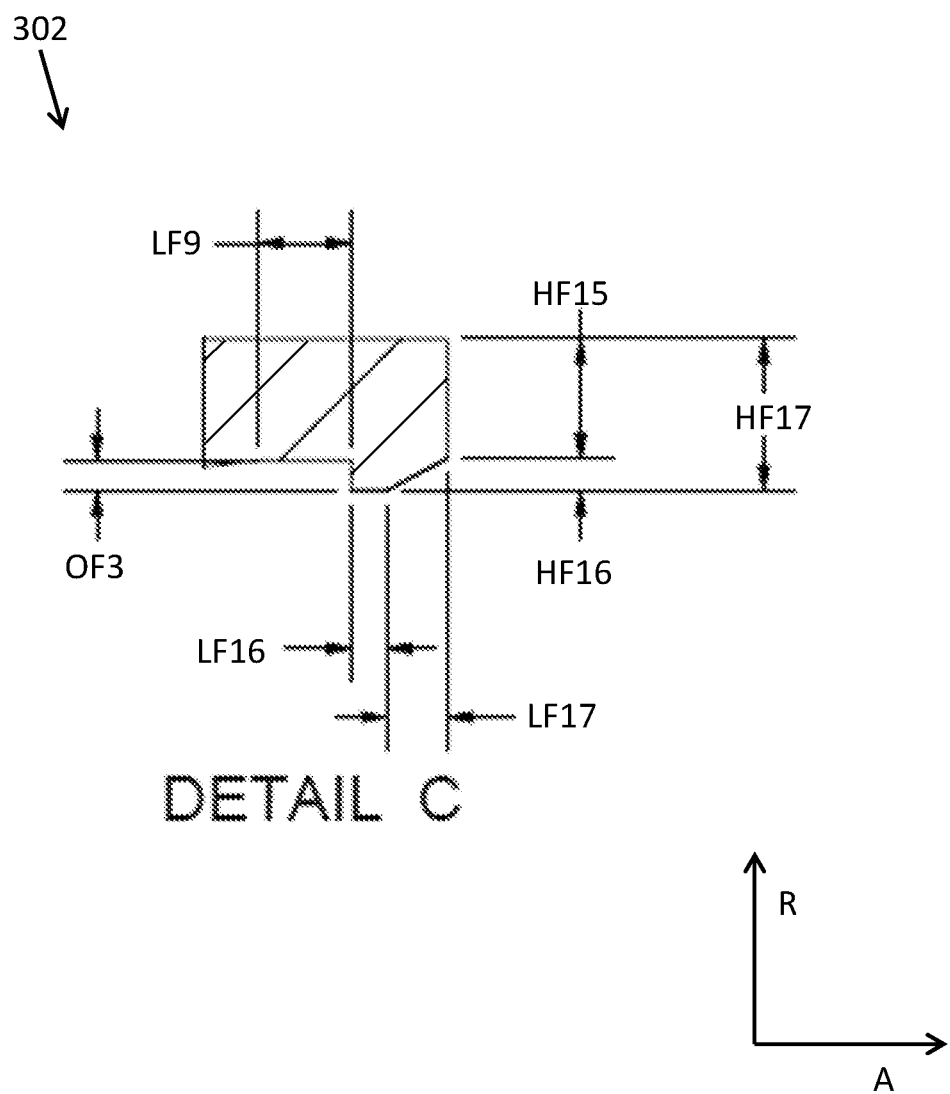
FIG. 3I illustrates a partial sectional view of female fitting 302 and male fitting 304 engaging one another during the process of joining the pipes to one another.
FIG. 3J illustrates a partial sectional view of female fitting 302 and male fitting 304 engaging one another during the process of joining the pipes to one another.
FIG. 3K illustrates a partial sectional view of female fitting 302 and male fitting 304 engaging one another during the process of joining the pipes to one another.
FIG. 3L illustrates a partial sectional view of female fitting 302 and male fitting 304 engaging one another during the process of joining the pipes to one another.
FIG. 3M illustrates a partial sectional view of female fitting 302 and male fitting 304 engaging one another during the process of joining the pipes to one another.
FIG. 3N illustrates a partial sectional view of female fitting 302 and male fitting 304 engaging one another.
Figure 3I:
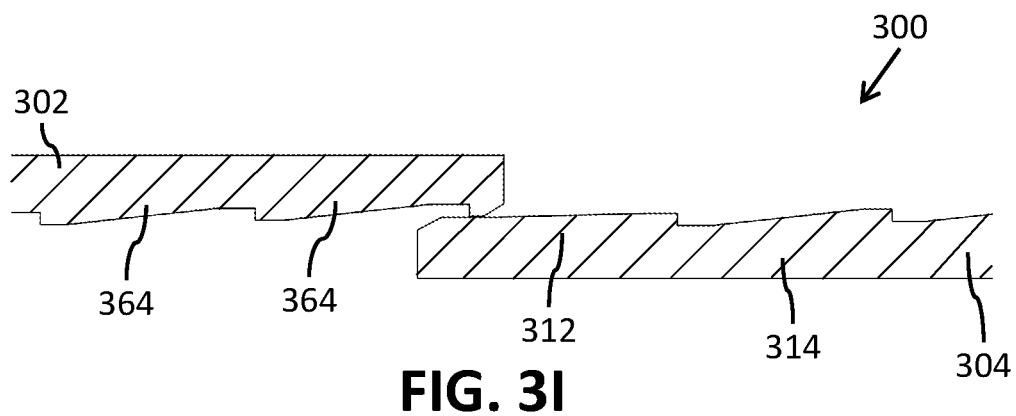
Figure 3J:
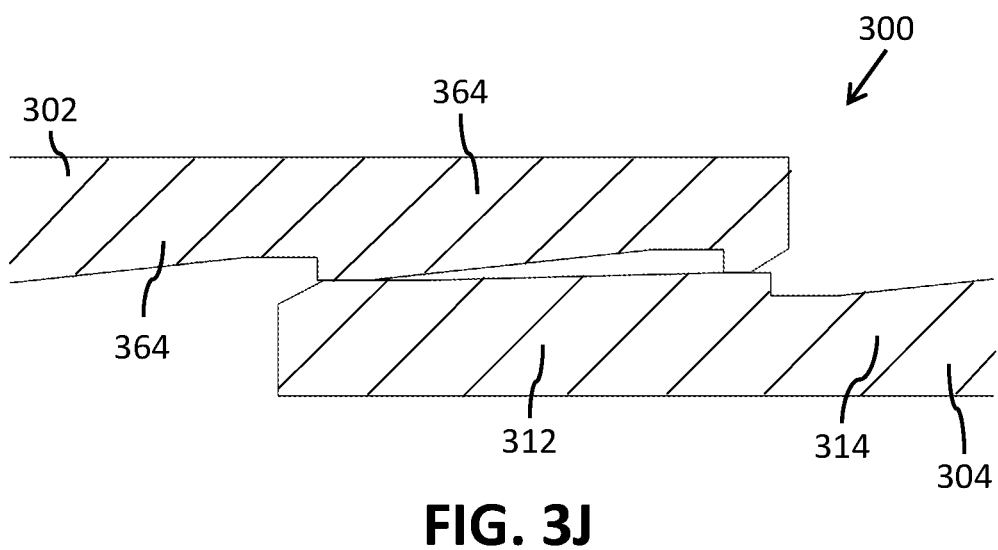
Figure 3K:
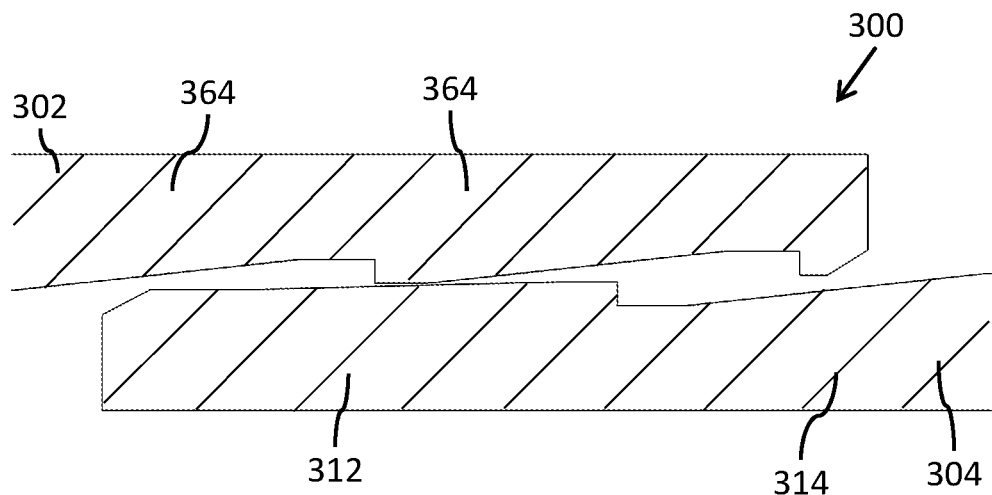
Figure 3L:
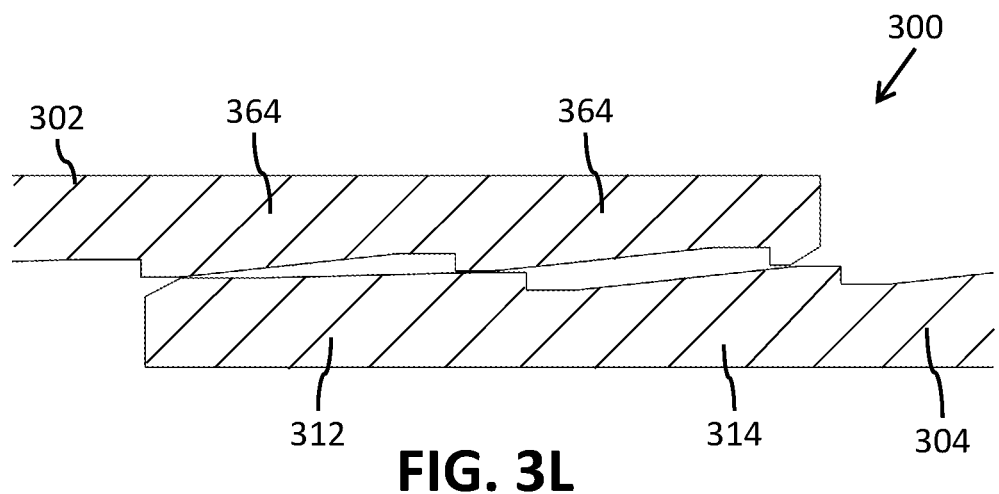
Figure 3M:
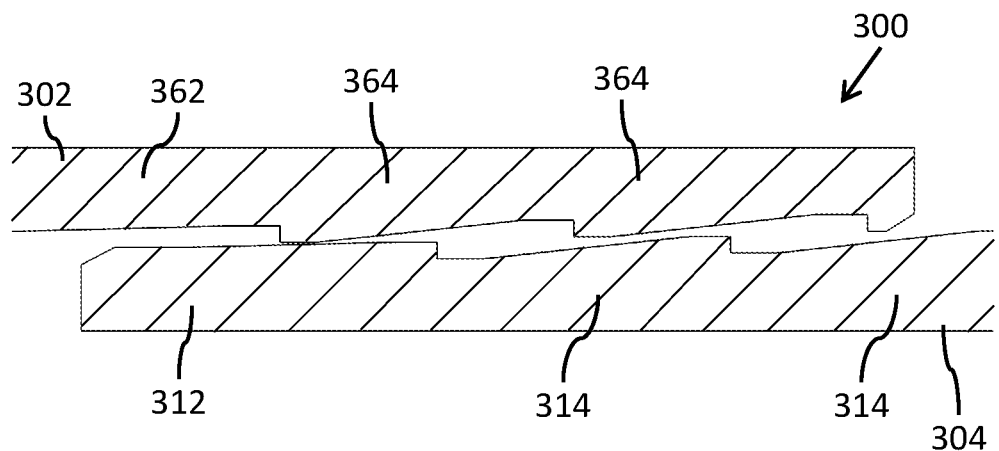

FIG. 3F-3H illustrate various dimensions associated with the profile of male fitting 304.

With specific reference to FIG. 3F, LF1 is the axial length of first axial surface 368. LF2 is the axial length of first ramped surface 370. Angle AF1 is the angle of first ramped surface 370 relative to axial direction A. HF2 is the radial height of second axial surface 372 measured from radially inner surface 398. HF3 is the radial height of third axial surface 376 measured from radially inner surface 398. Angle AF2 is the angle of second ramped surface 378 relative to axial direction A. HF4 is the radial height of fourth axial surface 380 measured from radially inner surface 398. HF5 is the radial height of fifth axial surface 384 measured from radially inner surface 398. Angle AF3 is the angle of third ramped surface 386 relative to axial direction A. HF6 is the radial height of sixth axial surface 388 measured from radially inner surface 398. HF7 is the radial height of seventh axial surface 392 measured from radially inner surface 398. HF15 is the radial height of radial distal surface 365. OL2 is the overall axial length of female fitting 302.

With specific reference to FIG. 3G, LF1 is the axial length of first axial surface 368. LF2 is the axial length of first ramped surface 370. LF3 is the axial length of second axial surface 372. LF4 is the axial length of third axial surface 376. LF5 is the axial length of second ramped surface 378. LF6 is the axial length of fourth axial surface 380. LF15 is the axial length from second radial surface 382 to the distal end of third ramped surface 386. LF11 is the axial length of first load cavity 364, from first radial surface 374 to second radial surface 382. LF7 is the axial length of fifth axial surface 384. LF8 is the axial length of third ramped surface

386. OF1 is the radial height of first radial surface 374. OF2 is the radial height of second radial surface 382.

With specific reference to FIG. 3H, OF3 is the radial height of third radial surface 390. LF9 is the axial length of sixth axial surface 388. LF16 is the axial length of seventh axial surface 392. LF17 is the axial length of beveled alignment surface 366. HF16 is the radial height of beveled alignment surface 366. HF15 is the radial height of radial distal surface 365. HF17 is the radial height from seventh axial surface 392 to radially outer surface 396.

The relationship between the various elements of female fitting 302 are the same as like elements contained in male fitting 304. Accordingly, the relationships described above with respect to male fitting 304 can be extrapolated and equally applied to female fitting 302.

FIGS. 3I-3M illustrate partial sectional views of female fitting 302 and male fitting 304 engaging one another during the process of joining the fittings to one another. As illustrated, as female fitting 302 and male fitting 304 move axially toward one another, the fittings contact one another at various points, until full engagement as illustrated in FIG. 3N.

Figure 3N:
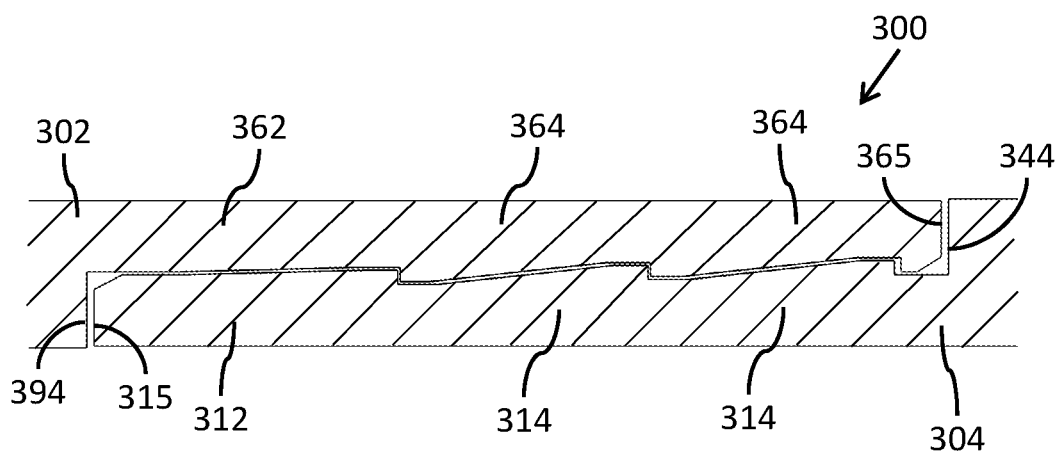

As illustrated, in FIG. 3N, when female fitting 302 and male fitting 304 are fully engaged, a gap may exist between the adjacent radial distal surface 315 and radial proximal surface 394, and/or between the adjacent radial distal surface 365 and radial proximal surface 344. This gap may aid in the full engagement of female fitting 302 with male fitting 304 by providing clearance for the accumulation of debris, lubricants, sealants, and the like during insertion of male fitting 304 into female fitting 302. When male fitting 304 and female fitting 302 are fully engaged, alignment tooth 312 fits within alignment cavity 362, and at least one load tooth 314 fits within at least one load cavity 364.

As can be seen in FIG. 3N, when male fitting 304 and female fitting 302 are fully engaged and placed in tension, so as to attempt to cause the disassembly of male fitting 304 and female fitting 302, forces are experienced particularly between the pairs of the first, second, and third radial surfaces.

Figure 4:
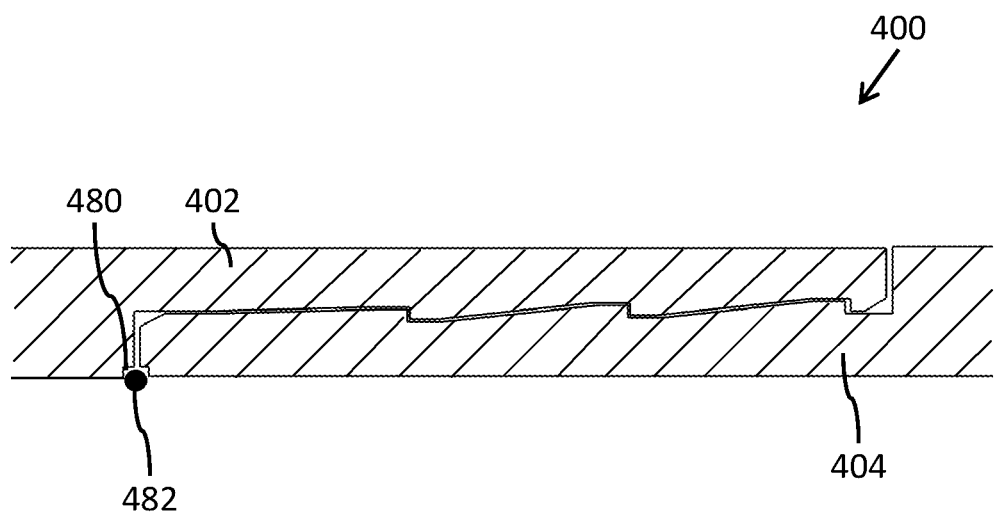
FIG. 4 illustrates a partial sectional view of female fitting 402 and male fitting 404 joined to one another, including an internal notch 480 and a seal 482.

FIG. 4 illustrates a partial sectional view of a pipe assembly 400, including female fitting 402 and male fitting 404 joined to one another, including an internal notch 480 and a seal 482. Internal notch 480 may be formed by providing a groove on the radially inner surfaces of female fitting 402 and male fitting 404 near the interface between the radial proximal surface of female fitting 402, and the radial distal surface of male fitting 404. Seal 482 may be any of a variety of sealing elements known in industry, including for example a rubber, metal, or polymer ring, a sealant, an epoxy, and the like. Seal 482 is placed within notch 480 to seal the engaged fittings to the extent desired by one using them.

Figure 5:
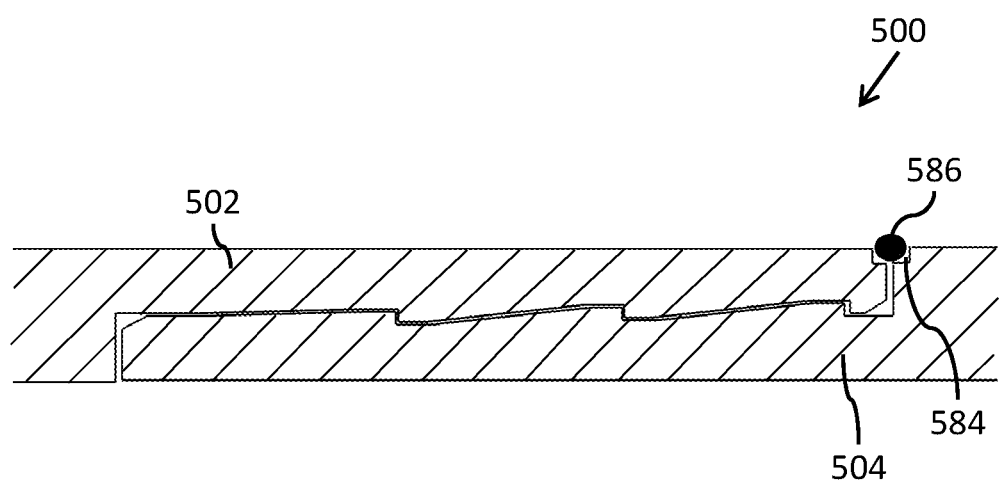
FIG. 5 illustrates a partial sectional view of female fitting 502 and male fitting 504 joined to one another, including an external notch 584 and a seal 586.

FIG. 5 illustrates a partial sectional view of a pipe assembly 500, including female fitting 502 and male fitting 504 joined to one another, including an external notch 584 and a seal 586. External notch 584 may be formed by providing a groove on the radially outer surfaces of female fitting 502 and male fitting 504 near the interface between the radial proximal surface of male fitting 504, and the radial distal surface of female fitting 502. Seal 586 may be any of a variety of sealing elements known in industry, including for example a rubber, metal, or polymer ring, a sealant, an epoxy, and the like. Seal 586 is placed within notch 584 to seal the engaged fittings to the extent desired by one using them.

Example 1—Three Tooth/Cavity Assembly

Figure 6:
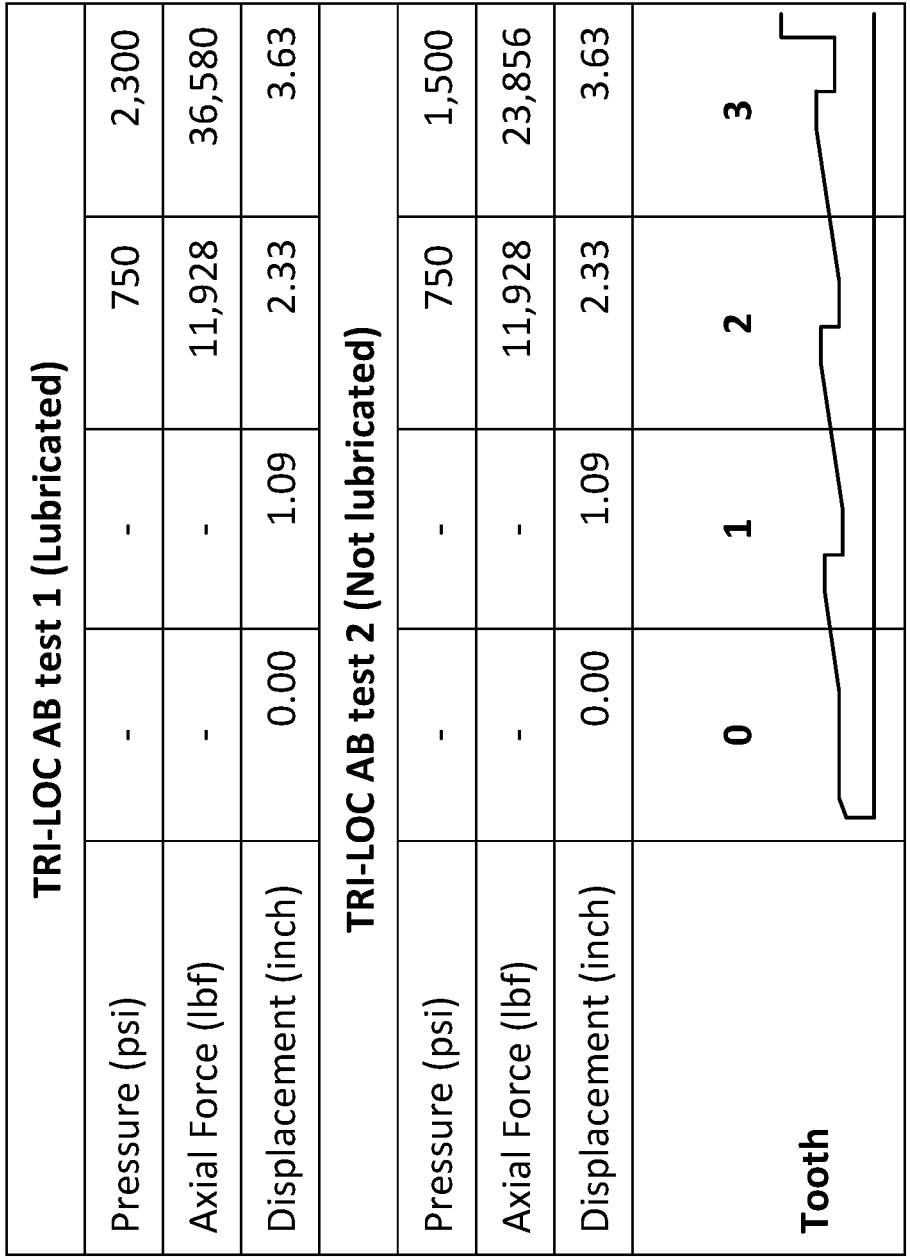
FIG. 6 is a table illustrating TRI-LOC AB Joint Assembly forces during assembly of the male and female fittings.

A male fitting having three teeth, and a female fitting having three cavities as described herein were joined to full engagement. The fittings had a 36 in. (91.4 cm) diameter and were each welded to corresponding lengths of pipes, having the same diameter. The fittings were machined into A252 grade 3 steel. A 100 ton (890 kN) press was used insert the male fitting into the female fitting until full engagement between the two. The test was performed with two sets of fittings, one using lubrication and one not using lubrication. Pressures, forces, and displacement were measured during the assembly process. FIG. 6 is a table illustrating TRI-LOC AB Joint Assembly force data collected during the assembly process.

Figure 7A:
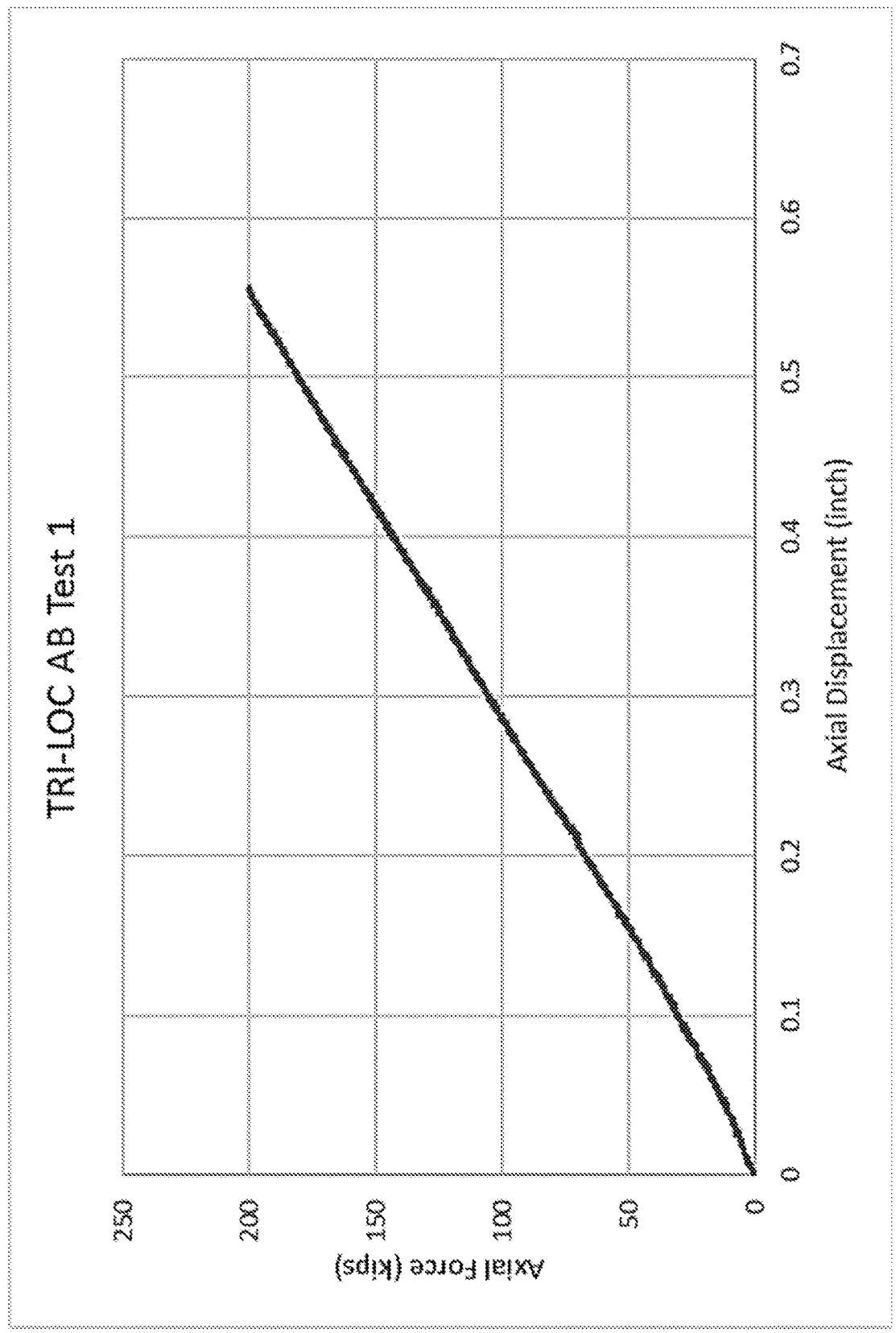
FIG. 7A is a graph illustrating displacement relative to axial compressive force applied to the male and female fittings during assembly, corresponding to Test 1 in FIG. 6.
Figure 7B:
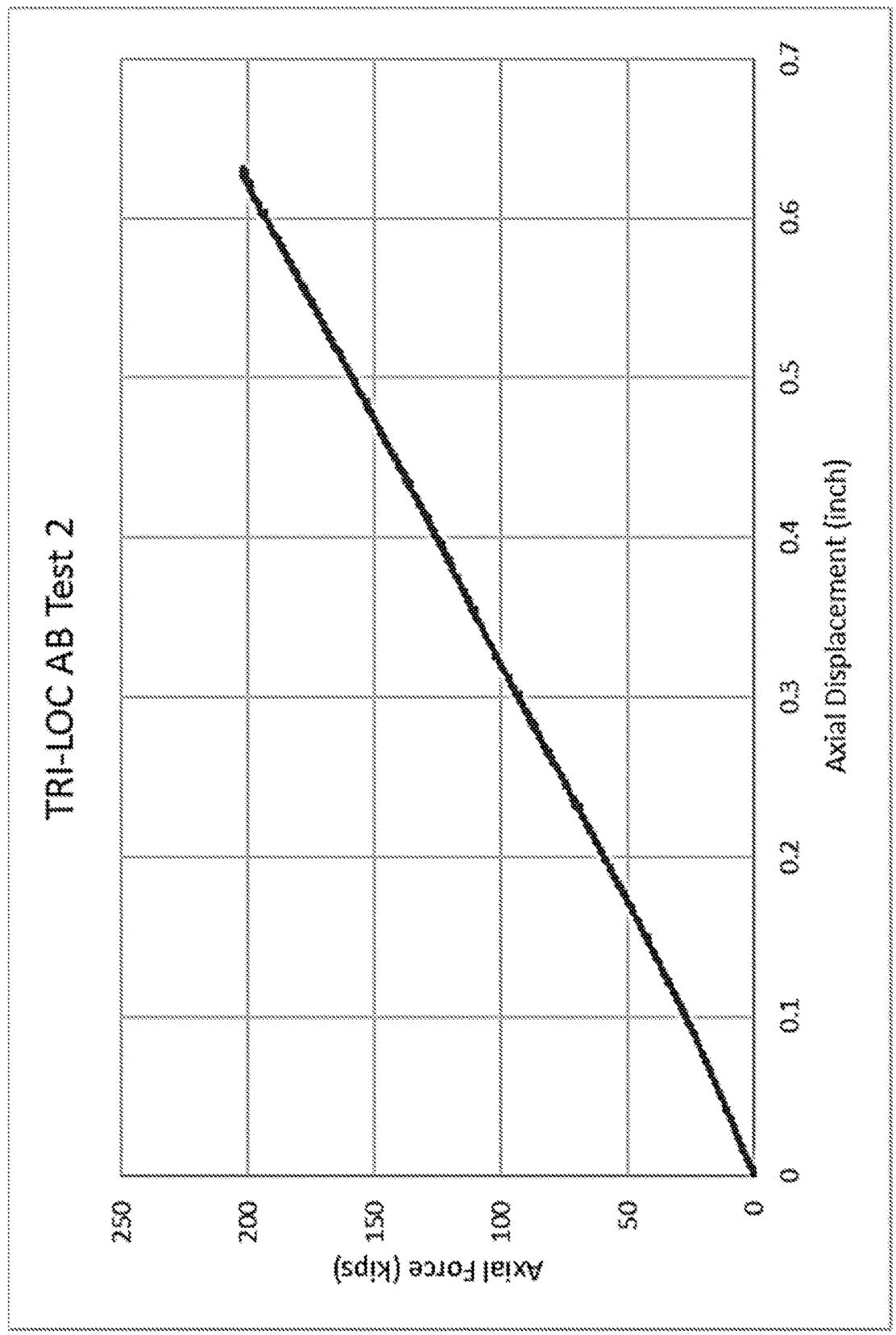
FIG. 7B is a graph illustrating displacement relative to axial compressive force applied to the male and female fittings during assembly, corresponding to Test 2 in FIG. 6.

The graphs in FIGS. 7A and 7B illustrate displacement relative to axial compressive force applied to the fittings during assembly corresponding to tests 1 and 2 in FIG. 6.

Example 2—Four Tooth/Cavity Assembly

A male fitting having four teeth, and a female fitting having four cavities as described herein were joined to full engagement. The fittings had a 36 in. (91.4 cm) diameter and were each welded to corresponding lengths of pipes, having the same diameter. The fittings were machined into A252 grade 3 steel. A 100 ton (890 kN) press was used insert the male fitting into the female fitting until full engagement between the two. The test was performed with two sets of fittings, one using lubrication and one not using lubrication. Pressures, forces, and displacement were measured during the assembly process. FIG. 8 is a table illustrating TRI-LOC MT Joint Assembly force data collected during the assembly process.

Figure 9A:
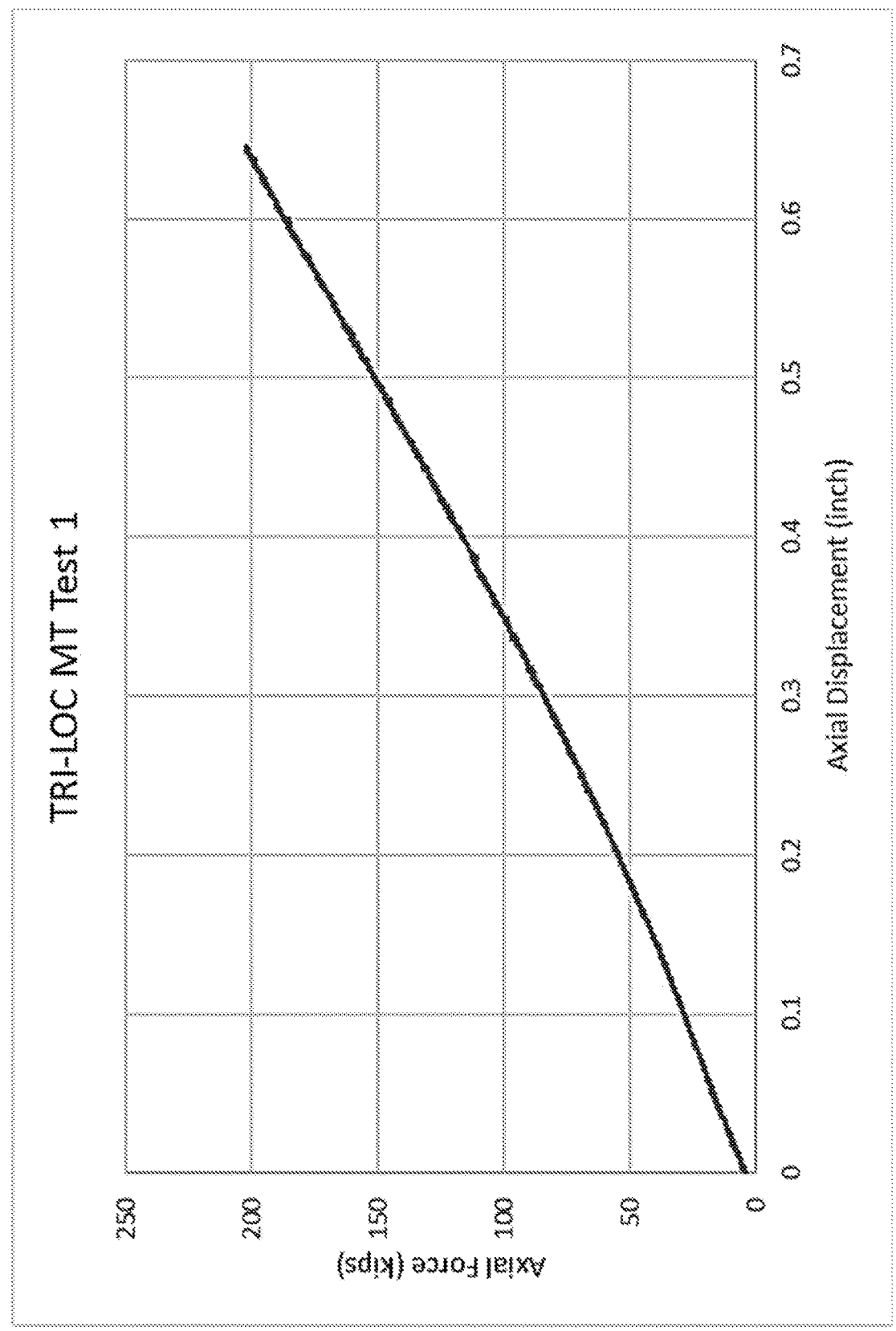
FIG. 9A is a graph illustrating displacement relative to axial compressive force applied to the male and female fittings during assembly, corresponding to Test 1 in FIG. 8.
Figure 9B:
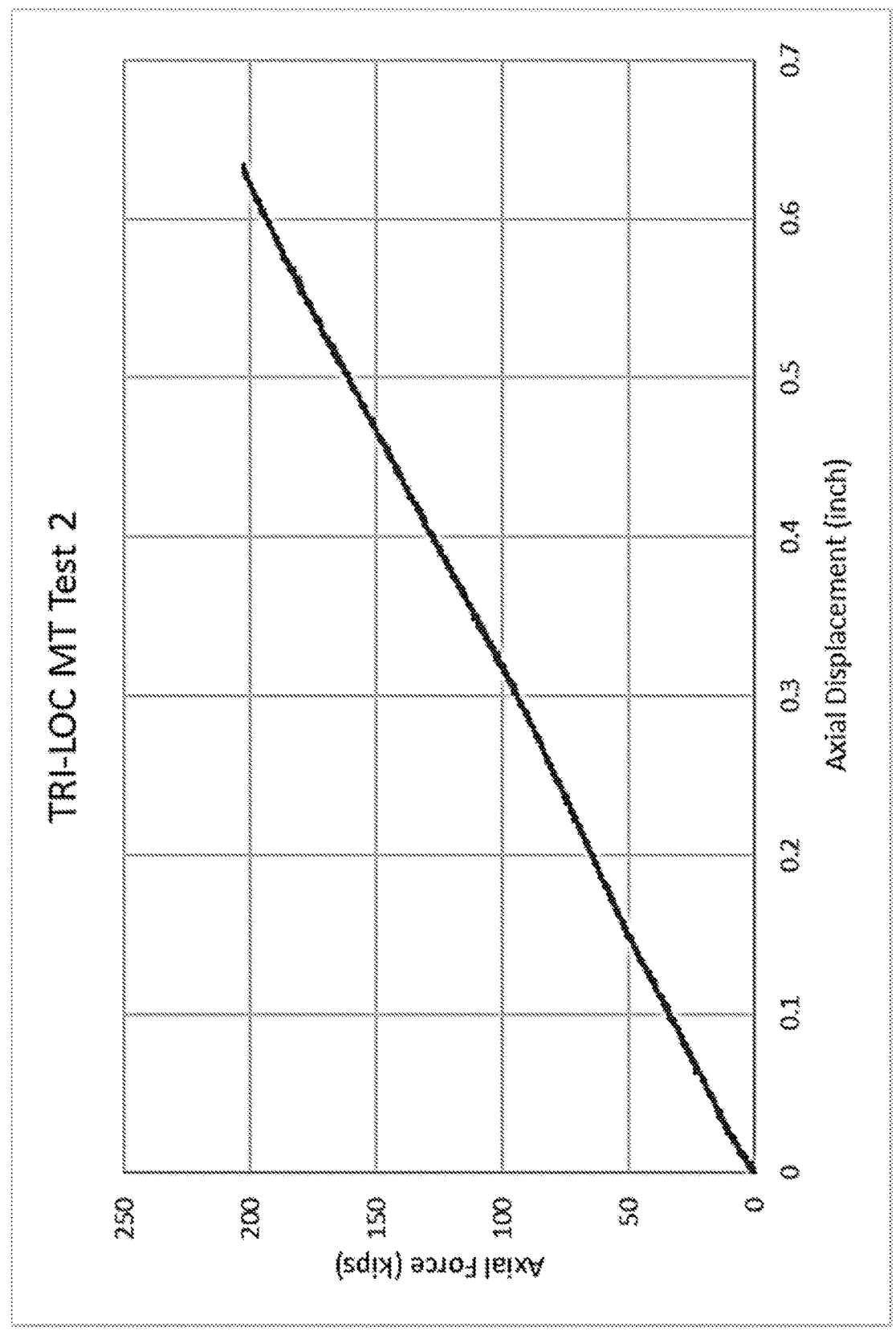
FIG. 9B is a graph illustrating displacement relative to axial compressive force applied to the male and female fittings during assembly, corresponding to Test 2 in FIG. 8.

The graphs in FIGS. 9A and 9B illustrate displacement relative to axial compressive force applied to the fittings during assembly corresponding to tests 1 and 2 in FIG. 8.

Example 3—Three Tooth/Cavity Disassembly

A male fitting having three teeth, and a female fitting having three cavities as described herein were joined to full engagement. The fittings had a 36 in. (91.4 cm) diameter and were each welded to corresponding lengths of pipes, having the same diameter. The fittings were machined into A252 grade 3 steel. A 100 ton (890 kN) press was used to attempt to pull the fittings apart, and failed to do so. Thus, the male and female fittings utilizing three teeth and cavities, respectively, have an engagement force exceeding 100 tons (890 kN) of force. No testing equipment capable of applying greater forces was available, and as such, no further testing was conducted.

Example 4—Four Tooth/Cavity Disassembly

A male fitting having four teeth (including three load teeth), and a female fitting having four cavities (including three load cavities) as described herein were joined to full engagement. The fittings had a 36 in. (91.4 cm) diameter and were each welded to corresponding lengths of pipes, having the same diameter. The fittings were machined into A252 grade 3 steel. A 100 ton (890 kN) press was used to attempt to pull the fittings apart, and failed to do so. Thus, the male and female fittings utilizing four teeth and cavities, respectively, have an engagement force exceeding 100 tons (890 kN) of force. No testing equipment capable of applying greater forces was available, and as such, no further testing was conducted.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A pipe assembly comprising:
   a male fitting, comprising:
      a body having a radially outer surface and a radially inner surface;
      a distal end and a proximal end; and
      an alignment tooth oriented closest to the distal end on a removed portion of the radially outer surface, and at least one load tooth on the removed portion of the radially outer surface,
         wherein the alignment tooth includes, from an alignment tooth distal direction toward an alignment tooth proximal direction, a first axial surface parallel to an axial direction of the pipe assembly, a first ramped surface biased with respect to the axial direction, a second axial surface parallel to the axial direction, and a first radial surface parallel to a radial direction of the pipe assembly,
         wherein the at least one load tooth includes, from a load tooth distal direction toward a load tooth proximal direction, a third axial surface parallel to the axial direction, a second ramped surface biased with respect to the axial direction, a fourth axial surface parallel to the axial direction, and a second radial surface parallel to the radial direction,
         wherein the first axial surface, the second axial surface, the third axial surface, and the fourth axial surface each have a radial height measured from the radially inner surface, and wherein the radial height of the fourth axial surface is greater than the radial height of the second axial surface, the radial height of the second axial surface is greater than the radial height of the first axial surface, and the radial height of the first axial surface is greater than the radial height of the third axial surface, and
         wherein the first ramped surface is biased at an angle AM1 relative to the axial direction, the second ramped surface is biased at an angle AM2 relative to the axial direction, and wherein the angle AM1 is smaller than the angle AM2, and
   a female fitting, comprising:
      a body having a radially inner surface and a radially outer surface;
      a distal end and a proximal end; and
      an alignment cavity oriented closest to the proximal end on a removed portion of the radially inner surface, and at least one load cavity on the removed portion of the radially inner surface,
         wherein the alignment cavity includes, from an alignment cavity proximal direction toward an alignment cavity distal direction, a first axial surface parallel to the axial direction, a first ramped surface biased with respect to the axial direction, a second axial surface parallel to the axial direction, and a first radial surface parallel to the radial direction,
         wherein the at least one load cavity includes, from a load cavity proximal direction toward a load cavity distal direction, a third axial surface parallel to the axial direction, a second ramped surface biased with respect to the axial direction, a fourth axial surface parallel to the axial direction, and a second radial surface parallel to the radial direction,
         wherein the first axial surface, the second axial surface, the third axial surface, and the fourth axial surface each have a radial height measured from the radially outer surface, and wherein the radial height of the third axial surface is greater than the radial height of the first axial surface, the radial height of the first axial surface is greater than the radial height of the second axial surface, and the radial height of the second axial surface is greater than the radial height of the fourth axial surface, and
         wherein the first ramped surface is biased at an angle AF1 relative to the axial direction, the second ramped surface is biased at an angle AF2 relative to the axial direction, and wherein the angle AF1 is smaller than the angle AF2, and
   when the male fitting is fully engaged with the female fitting, the alignment tooth fits within the alignment cavity, and the load tooth fits within the load cavity.

2. The assembly of claim 1, wherein the male fitting comprises a first load tooth and a second load tooth, wherein the female fitting comprises a first load cavity and a second load cavity, and wherein when the male fitting is fully engaged with the female fitting, the first load tooth fits within the first load cavity and the second load tooth fits within the second load cavity.

3. The assembly of claim 1, wherein the male fitting comprises a radial proximal surface parallel to the radial direction and a radial distal surface parallel to the radial direction, wherein the female fitting comprises a radial proximal surface parallel to the radial direction and a radial distal surface parallel to the radial direction, and wherein when the male fitting is fully engaged with the female fitting, the male fitting radial proximal surface is adjacent to the female fitting radial distal surface and the male fitting radial distal surface is adjacent to the female fitting radial proximal surface.

4. The assembly of claim 1, wherein the male fitting includes a beveled alignment surface near its distal end, and wherein the female fitting includes a beveled alignment surface near its distal end.

5. The assembly of claim 2, wherein:
the second load tooth includes, from a load tooth distal direction toward a load tooth proximal direction, a fifth axial surface parallel to the axial direction, a third ramped surface biased with respect to the axial direction, a sixth axial surface parallel to the axial direction, and a third radial surface parallel to the radial direction,
the second load cavity includes, from a load cavity proximal direction toward a load cavity distal direction, a fifth axial surface parallel to the axial direction, a third ramped surface biased with respect to the axial direction, a sixth axial surface parallel to the axial direction, and a third radial surface parallel to the radial direction.

6. The assembly of claim 5, wherein:
in the second load tooth, the fifth axial surface and the sixth axial surface each have a radial height measured from the radially inner surface,
wherein the radial height of the sixth axial surface is greater than the radial height of the fourth axial surface, the radial height of the fourth axial surface is greater than the radial height of the second axial surface, the radial height of the second axial surface is greater than the radial height of the first axial surface, the radial height of the first axial surface is greater than the radial height of the fifth axial surface, and the radial height of the fifth axial surface is greater than the height of the third axial surface,
in the second load cavity, the fifth axial surface and the sixth axial surface each have a radial height measured from the radially outer surface, and
wherein the radial height of the third axial surface is greater than the radial height of the fifth axial surface, the radial height of the fifth axial surface is greater than the radial height of the first axial surface, the radial height of the first axial surface is greater than the radial height of the second axial surface, the radial height of the second axial surface is greater than the radial height of the fourth axial surface, and the radial height of the fourth axial surface is greater than the height of the sixth axial surface.

7. The assembly of claim 5, wherein:
in the second load tooth, the third ramped surface is biased at an angle AM3, wherein the angle AM1 is smaller than angle AM3,
in the second load cavity, the third ramped surface is biased at an angle AF3, and wherein the angle AF1 is smaller than angle AF3.

8. The assembly of claim 1, wherein the male fitting includes an annular portion of pipe, and the female fitting includes an annular portion of pipe.

9. The assembly of claim 1, wherein:
the male fitting includes a radial proximal surface parallel to the radial direction and a seventh axial surface parallel to the axial direction and extending to the radial proximal surface,
wherein the seventh axial surface has a radial height measured from the radially inner surface, and
wherein the radial height of the seventh axial surface is equal to the radial height of the first axial surface; and
the female fitting includes a seventh axial surface parallel to the axial direction, wherein the seventh axial surface has a radial height measured from the radially outer surface, and
wherein the radial height of the seventh axial surface is equal to the radial height of the first axial surface.

10. The assembly of claim 3, wherein the female fitting includes a groove on the radially inner surface near the female fitting radial proximal surface, wherein the male fitting includes a groove on the radially inner surface near the male fitting distal surface, and wherein the grooves form an internal notch.

11. The assembly of claim 10, further comprising a seal oriented within the internal notch.

12. The assembly of claim 3, wherein the female fitting includes a groove on the radially outer surface near the female fitting radial distal surface, wherein the male fitting includes a groove no the radially outer surface near the male fitting proximal surface, and wherein the grooves form an external notch.

13. The assembly of claim 12, further comprising a seal oriented within the external notch.

14. A pipe assembly comprising:
a male fitting, comprising:
a body having a radially outer surface and a radially inner surface;
a distal end and a proximal end; and
an alignment tooth oriented closest to the distal end on a removed portion of the radially outer surface, and at least one load tooth on the removed portion of the radially outer surface,
wherein the alignment tooth includes, from an alignment tooth distal direction toward an alignment tooth proximal direction, a first axial surface parallel to an axial direction of the pipe assembly, a first ramped surface biased with respect to the axial direction, a second axial surface parallel to the axial direction, and a first radial surface parallel to a radial direction of the pipe assembly,
wherein the at least one load tooth includes, from a load tooth distal direction toward a load tooth proximal direction, a third axial surface parallel to the axial direction, a second ramped surface biased with respect to the axial direction, a fourth axial surface parallel to the axial direction, and a second radial surface parallel to the radial direction,
wherein the first axial surface, the second axial surface, the third axial surface, and the fourth axial surface each have a radial height measured from the radially inner surface, and wherein the radial height of the fourth axial surface is greater than the radial height of the second axial surface, the radial height of the second axial surface is greater than the radial height of the first axial surface, and the radial height of the first axial surface is greater than the radial height of the third axial surface, and a female fitting, comprising:
- a body having a radially inner surface and a radially outer surface;
- a distal end and a proximal end; and
- an alignment cavity oriented closest to the proximal end on a removed portion of the radially inner surface, and at least one load cavity on the removed portion of the radially inner surface,
    - wherein the alignment cavity includes, from an alignment cavity proximal direction toward an alignment cavity distal direction, a first axial surface parallel to the axial direction, a first ramped surface biased with respect to the axial direction, a second axial surface parallel to the axial direction, and a first radial surface parallel to the radial direction,
    - wherein the at least one load cavity includes, from a load cavity proximal direction toward a load cavity distal direction, a third axial surface parallel to the axial direction, a second ramped surface biased with respect to the axial direction, a fourth axial surface parallel to the axial direction, and a second radial surface parallel to the radial direction,
    - wherein the first axial surface, the second axial surface, the third axial surface, and the fourth axial surface each have a radial height measured from the radially outer surface, and wherein the radial height of the third axial surface is greater than the radial height of the first axial surface, the radial height of the first axial surface is greater than the radial height of the second axial surface, and the radial height of the second axial surface is greater than the radial height of the fourth axial surface, and
    - when the male fitting is fully engaged with the female fitting, the alignment tooth fits within the alignment cavity, and the load tooth fits within the load cavity.

15. The assembly of claim 14, wherein the first ramped surface is biased at an angle AM1 relative to the axial direction, the second ramped surface is biased at an angle AM2 relative to the axial direction, and wherein the angle AM1 is smaller than the angle AM2.

16. The assembly of claim 14, wherein the first ramped surface is biased at an angle AF1 relative to the axial direction, the second ramped surface is biased at an angle AF2 relative to the axial direction, and wherein the angle AF1 is smaller than the angle AF2.

17. The assembly of claim 14, wherein the male fitting comprises a first load tooth and a second load tooth, wherein the female fitting comprises a first load cavity and a second load cavity, and wherein when the male fitting is fully engaged with the female fitting, the first load tooth fits within the first load cavity and the second load tooth fits within the second load cavity.

18. The assembly of claim 14, wherein the male fitting comprises a radial proximal surface parallel to the radial direction and a radial distal surface parallel to the radial direction, wherein the female fitting comprises a radial proximal surface parallel to the radial direction and a radial distal surface parallel to the radial direction, and wherein when the male fitting is fully engaged with the female fitting, the male fitting radial proximal surface is adjacent to the female fitting radial distal surface and the male fitting radial distal surface is adjacent to the female fitting radial proximal surface.

19. The assembly of claim 17, wherein:
the second load tooth includes, from a load tooth distal direction toward a load tooth proximal direction, a fifth axial surface parallel to the axial direction, a third ramped surface biased with respect to the axial direction, a sixth axial surface parallel to the axial direction, and a third radial surface parallel to the radial direction,
the second load cavity includes, from a load cavity proximal direction toward a load cavity distal direction, a fifth axial surface parallel to the axial direction, a third ramped surface biased with respect to the axial direction, a sixth axial surface parallel to the axial direction, and a third radial surface parallel to the radial direction.

20. The assembly of claim 19, wherein:
in the second load tooth, the fifth axial surface and the sixth axial surface each have a radial height measured from the radially inner surface,
wherein the radial height of the sixth axial surface is greater than the radial height of the fourth axial surface, the radial height of the fourth axial surface is greater than the radial height of the second axial surface, the radial height of the second axial surface is greater than the radial height of the first axial surface, the radial height of the first axial surface is greater than the radial height of the fifth axial surface, and the radial height of the fifth axial surface is greater than the height of the third axial surface,
in the second load cavity, the fifth axial surface and the sixth axial surface each have a radial height measured from the radially outer surface, and
wherein the radial height of the third axial surface is greater than the radial height of the fifth axial surface, the radial height of the fifth axial surface is greater than the radial height of the first axial surface, the radial height of the first axial surface is greater than the radial height of the second axial surface, the radial height of the second axial surface is greater than the radial height of the fourth axial surface, and the radial height of the fourth axial surface is greater than the height of the sixth axial surface.

* * * * *